United States Patent
Shrimali et al.

(10) Patent No.: US 10,671,951 B2
(45) Date of Patent: Jun. 2, 2020

(54) METHODS AND SYSTEMS TO DETERMINE CONTAINER COSTS AND ATTRIBUTE CONTAINER COSTS TO APPLICATIONS

(71) Applicant: VMware, Inc., Palo Alto, CA (US)

(72) Inventors: Avinash Shrimali, Bangalore (IN);
Amarnath Palayalli, Bangalore (IN);
Dattathreya Sathyamurthy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 830 days.

(21) Appl. No.: 15/075,389

(22) Filed: Mar. 21, 2016

(65) Prior Publication Data
US 2017/0270449 A1    Sep. 21, 2017

(51) Int. Cl.
*G06Q 10/06* (2012.01)
*G06F 8/00* (2018.01)
*G06F 9/455* (2018.01)

(52) U.S. Cl.
CPC ......... *G06Q 10/06315* (2013.01); *G06F 8/00* (2013.01); *G06F 2009/45579* (2013.01); *G06F 2009/45583* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| 2015/0073960 A1* | 3/2015 | Santhi | G06Q 30/0631 705/35 |
|---|---|---|---|
| 2017/0123852 A1* | 5/2017 | Chagalakondu | G06F 9/45558 |
| 2017/0257424 A1* | 9/2017 | Neogi | H04L 43/16 |

\* cited by examiner

*Primary Examiner* — Alan S Miller
*Assistant Examiner* — Arif Ullah
(74) *Attorney, Agent, or Firm* — Thomas Horstemeyer, LLP

(57) ABSTRACT

Methods and system to calculate a total container cost of each container of a data center are described. Methods compute a direct container cost of each container running in the data center based on container resource utilization and a resource utilization rate of each resource of a host. Methods also compute an indirect container cost of each container is calculated as a sum of indirect cost of each resource of the host used by the container and each resource of the host used by a monitor container that monitors each container utilization of host resources. For each container, a total container cost of the container is calculated as the sum of the direct container cost and the indirect container cost of the container. Total container costs are used to determine the cost of applications miming on the containers.

21 Claims, 24 Drawing Sheets

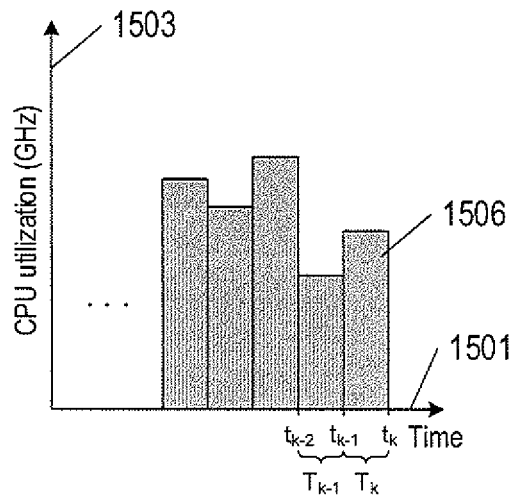
FIG. 15A
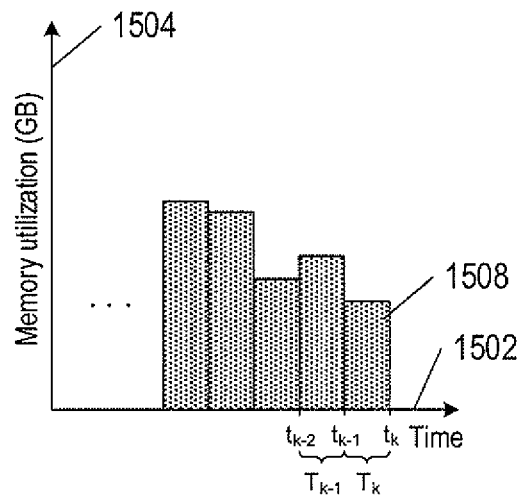
FIG. 15B
| Host | Mem rate ($/GB) | Mem util (GB) | CPU rate ($/GHz) | CPU util (GHz) |
|---|---|---|---|---|
| $VM_1$ | 21.32 | 2.4 | 51.74 | 0.27 |
| $VM_2$ | 15.60 | 1.7 | 43.19 | 0.31 |
| ⋮ | ⋮ | ⋮ | ⋮ | ⋮ |
| $VM_P$ | 33.41 | 2.1 | 29.42 | 0.23 |
| $SC_1$ | 12.12 | 0.8 | 32.75 | 0.02 |
| $SC_2$ | 48.23 | 1.3 | 44.71 | 0.04 |
| ⋮ | ⋮ | ⋮ | ⋮ | ⋮ |
| $SC_Q$ | 26.93 | 2.7 | 24.39 | 0.16 |
FIG. 16

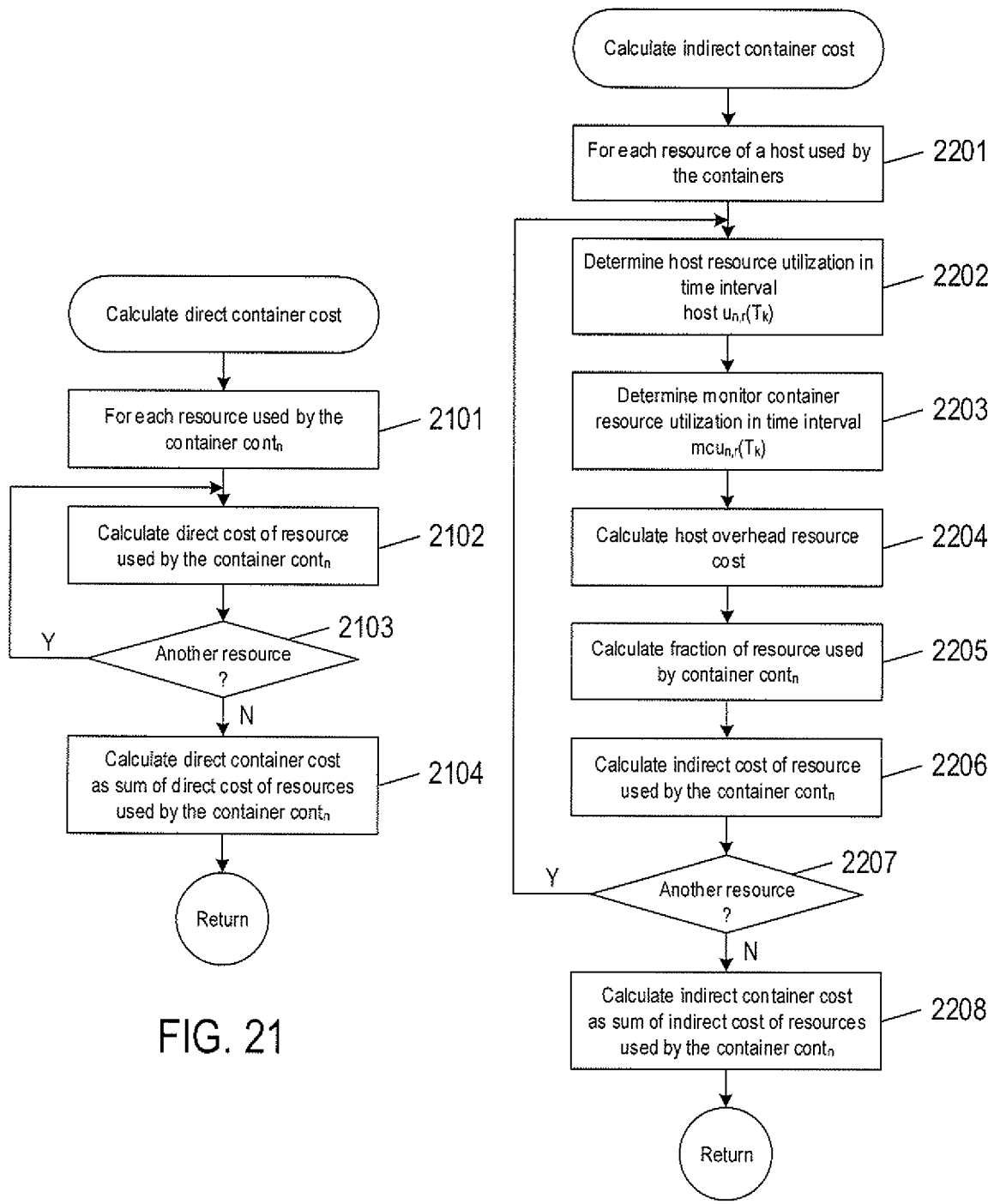

METHODS AND SYSTEMS TO DETERMINE CONTAINER COSTS AND ATTRIBUTE CONTAINER COSTS TO APPLICATIONS

TECHNICAL FIELD

This disclosure is directed to containers, and, in particular, to computational methods and systems that determine cost of containers and attributing the cost of the containers to applications that run in the containers.

BACKGROUND

As the number of enterprises that run their applications in data centers has increased, interest in developing and running these applications in containers has also increased. A container is an application packaged in a complete file system that includes the application code, runtime and system tools, system libraries, and configuration files. Containers effectively isolate applications running on the same host from each other and share the same operating system kernel of the host. Containers ensure that an application will run the same regardless of the computing environment the application is running in, because containers do not depend on any specific infrastructure. As a result, containers can be used to reliably run applications and move applications to different computing environments. For example, an application may be developed in a container on a developer's laptop and moved to a staging environment and into production on a server computer in a data center or to a virtual machine ("VM") in a private or public cloud without complications.

Running applications in containers and in VMs on physical computer systems are becoming common practice and each has its own merits. Consider an application run in a VM and run in a container. The VM runs a full copy of an operating system and a virtual copy of the hardware the operating system needs on top of the operating system of a server computer. On the other hand, the container runs the application using only a fraction of the operating system, support programs and libraries, and other resource of the server computer. As a result, the VM typically uses more RAM and CPU of the server computer than the container, the application may be started more quickly in the container than the VM, and many more applications may be run in containers on the server computer than may be run in VMs on the same server computer. Although containers appear to be a favorable alternative to VMs, containers do not provide the security benefits of VMs.

Because containers provide flexibility for application development and deployment, containers are often hard to monitor and meter. The volatile association of a container with a host server computer due to the container's short lived nature poses unique challenges for IT managers trying to track the cost of applications packaged in containers. Suppose an application is developed for a period of time in a container on a first host and the container is moved to a second host and developed for an additional period of time. IT managers need to accurately measure utilization of the container on both hosts and attribute the costs of running the application on the respective hosts. Many developers also view running containers on VMs as the direction of the future. As a result, IT managers seek methods to determine the cost of containers run on VMs and containers that run directly on a server computer before distributing the costs to the containers.

SUMMARY

Methods and system to calculate a total container cost of each container of a data center are described. In one aspect, a direct container cost of each container running in the data center is calculated based on container resource utilization and a resource utilization rate of each resource of a host. The hosts can be virtual machines and server computers. An indirect container cost of each container is calculated as a sum of indirect cost of each resource of the host used by the container and each resource of the host used by a monitor container that monitors each container utilization of host resources. For each container, a total container cost of the container is calculated as the sum of the direct container cost and the indirect container cost of the container. Once the total container cost is calculated for each of the containers, applications deployed in the containers are determined. The total container costs are used to determine the cost of the applications.

DESCRIPTION OF THE DRAWINGS

FIGS. 15A-15B show histograms of CPU and memory utilization, respectively, by a container running on a host.

FIG. 16 shows a table of hosts and examples of associated memory and CPU utilizations rates and examples of memory and CPU utilization over a time interval.

FIG. 21 shows a flow-control diagram of the routine "calculate direct container cost" called in FIG. 20.

FIG. 22 shows a flow-control diagram of the routine "calculate indirect container cost" called in FIG. 20.

DETAILED DESCRIPTION

Figure 1:
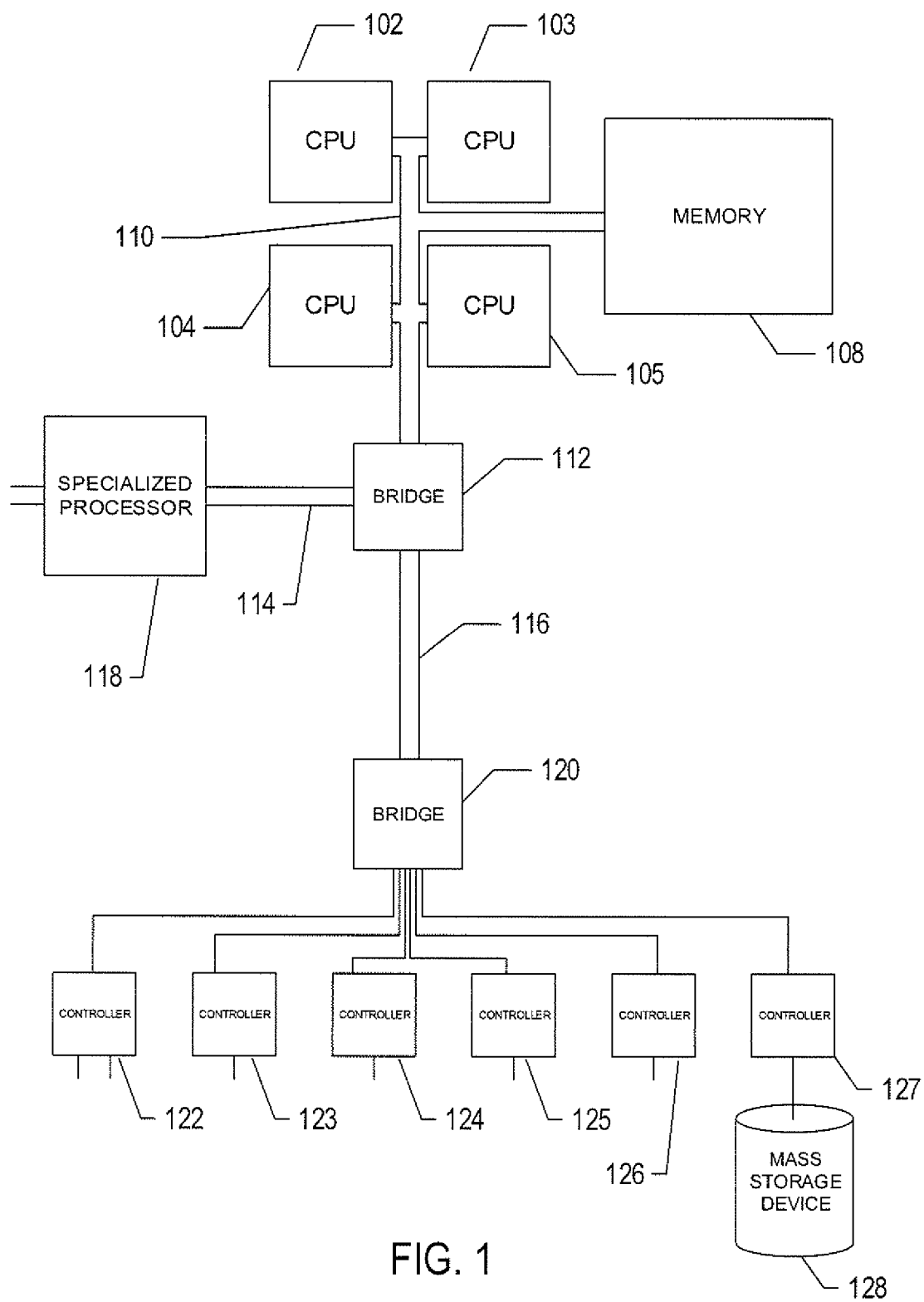
FIG. 1 shows a general architectural diagram for various types of computers.

This disclosure presents computational methods and systems to determine cost of containers in data center and attribute that cost of the containers to applications deployed in the containers. Computer hard, complex computational systems, and virtualization are described in a first subsection. Containers and containers supported by virtualization layers are described in second subsection. Computational methods and systems to determine costs of containers and attribute the costs to applications running in the containers are described in a third subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
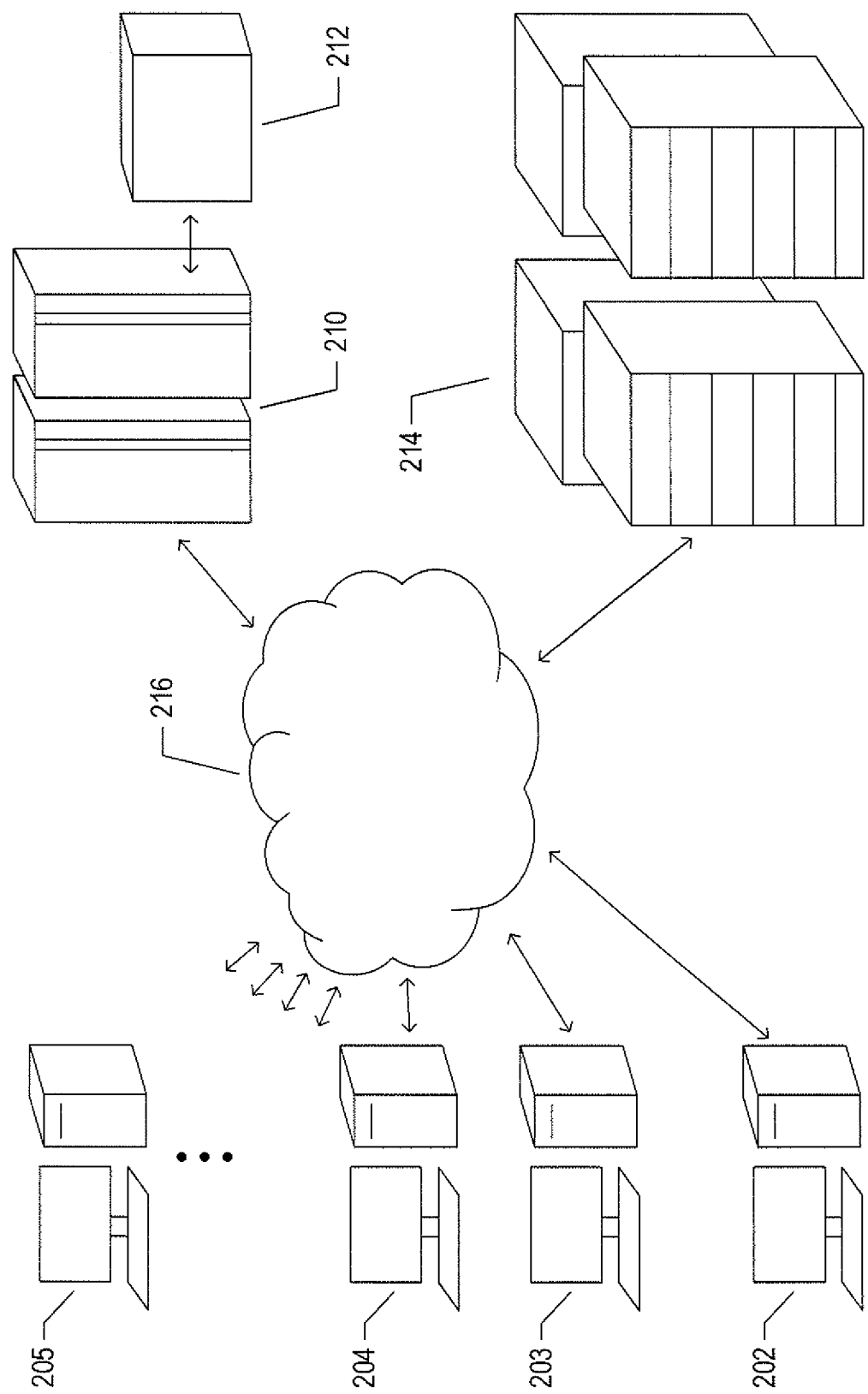
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
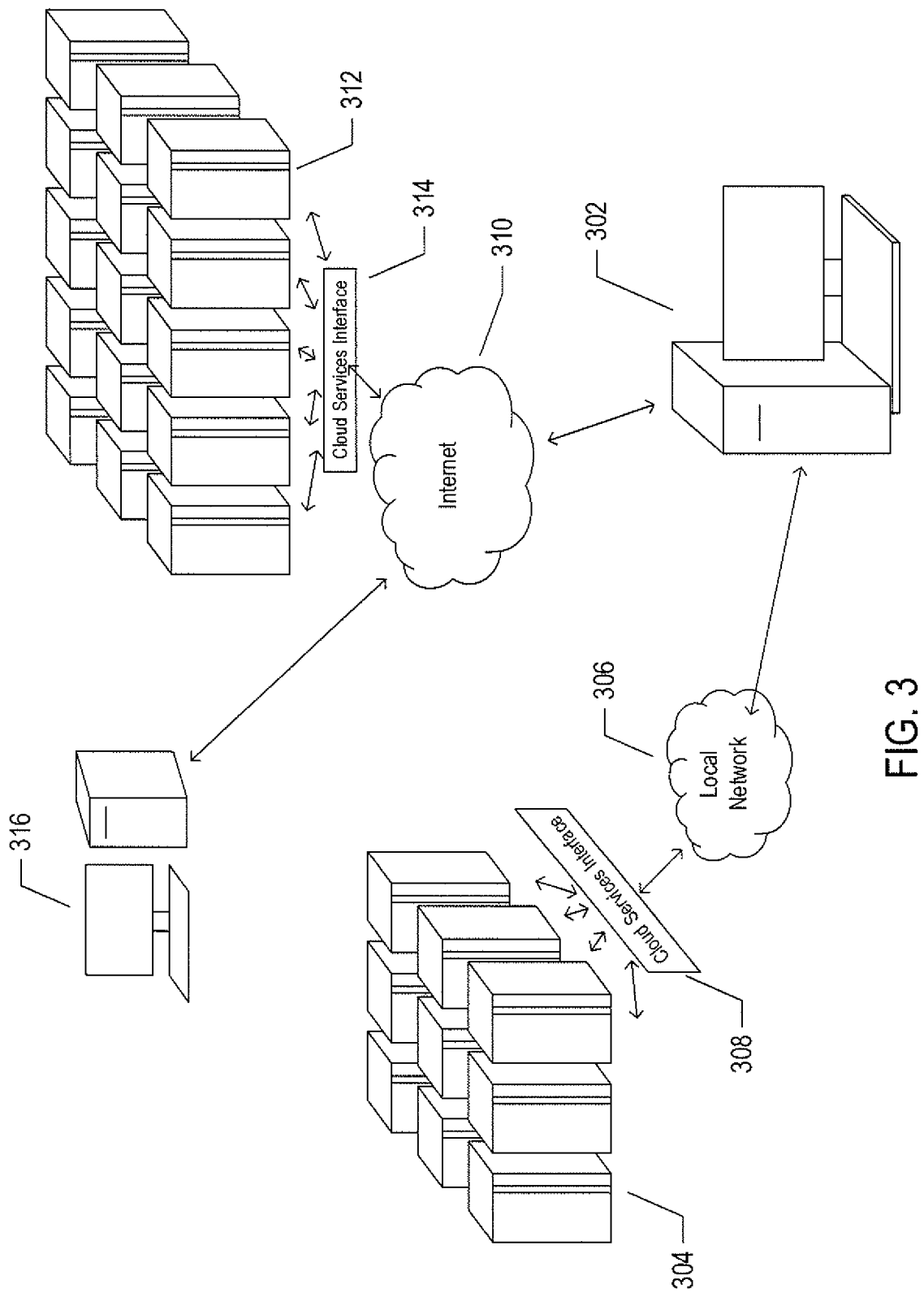
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
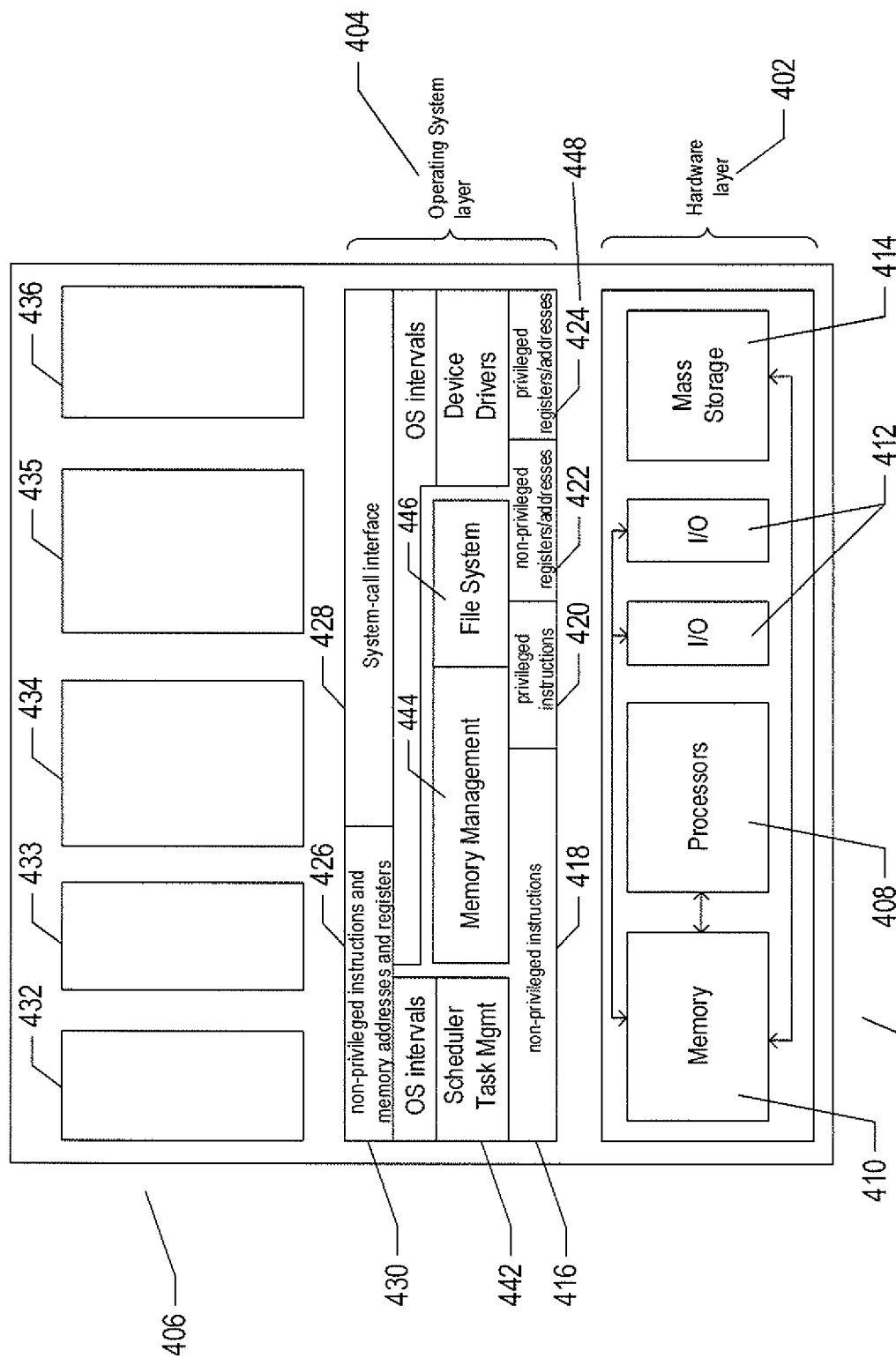
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
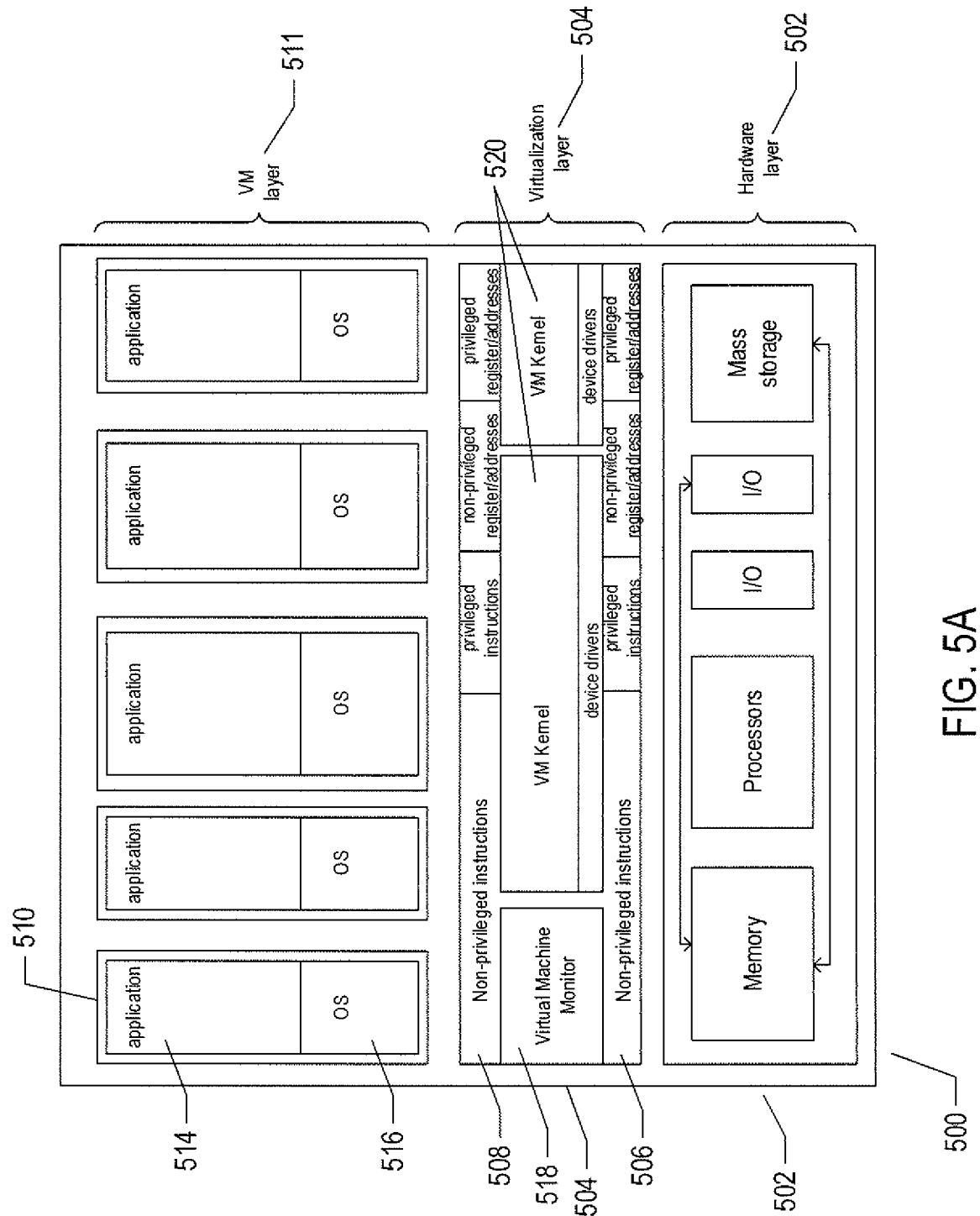
FIGS. 5A-5B show two types of virtual machine and virtual-machine execution environments.
Figure 5B:
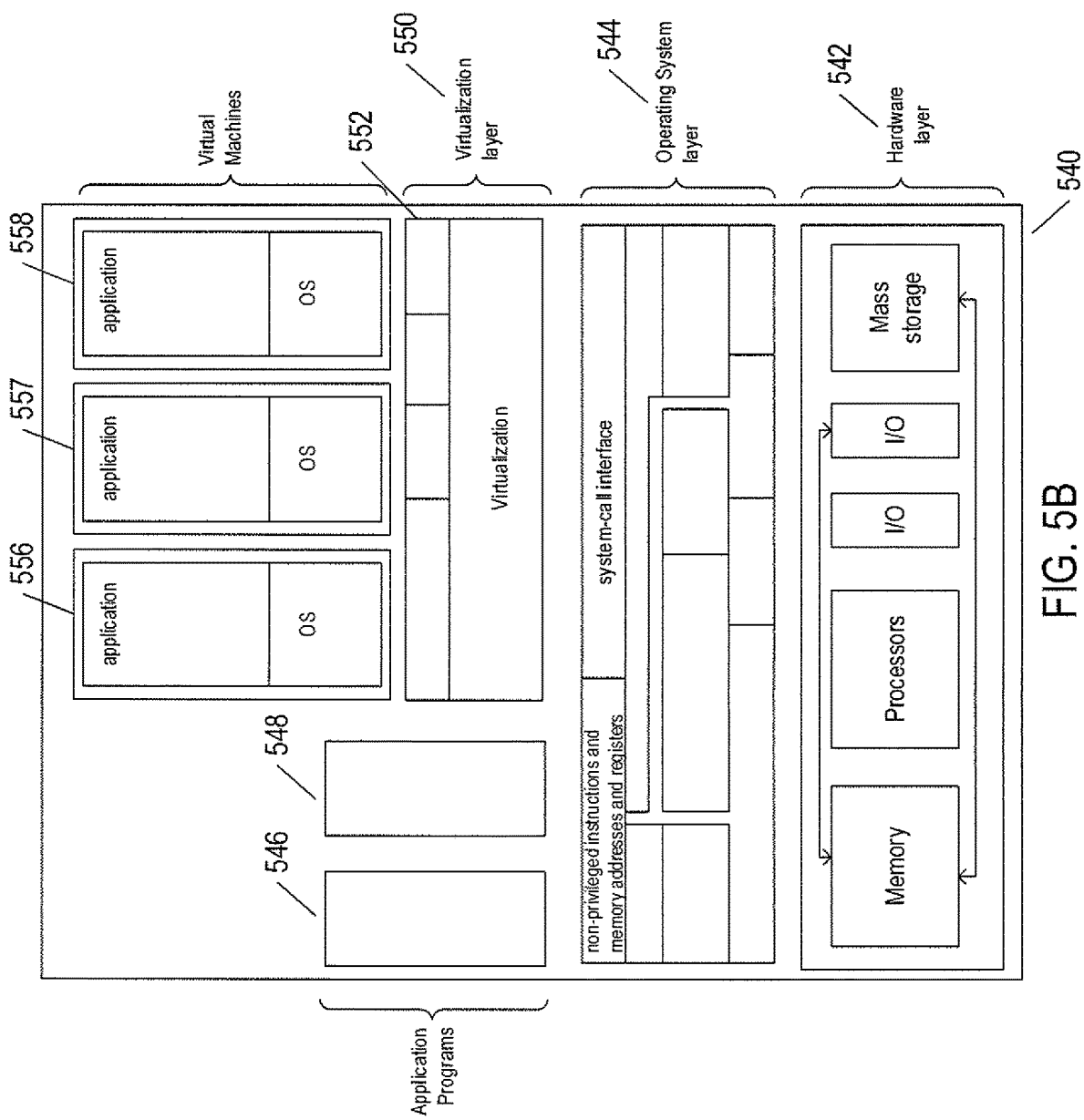

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
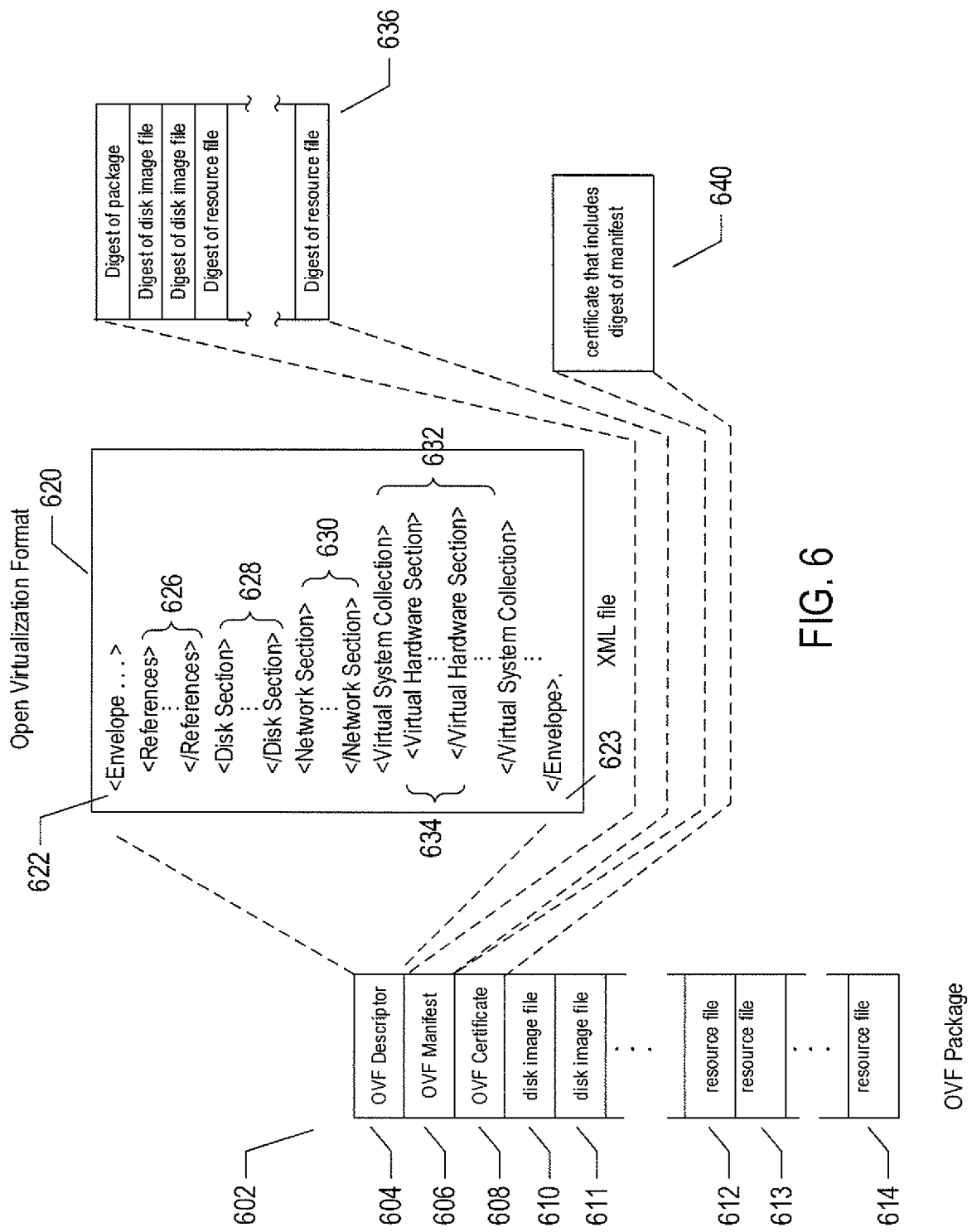
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the logical disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of logical disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
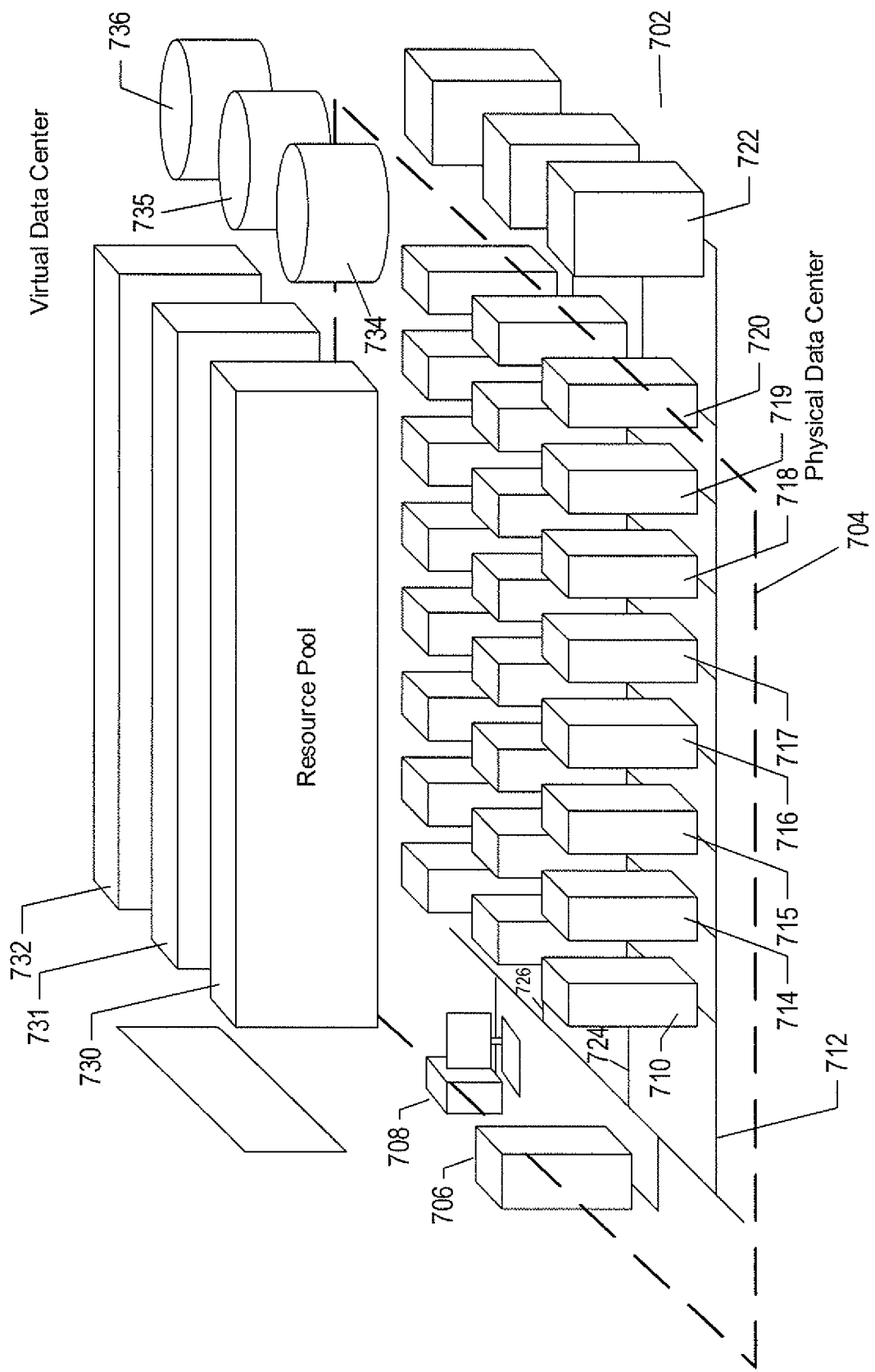
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
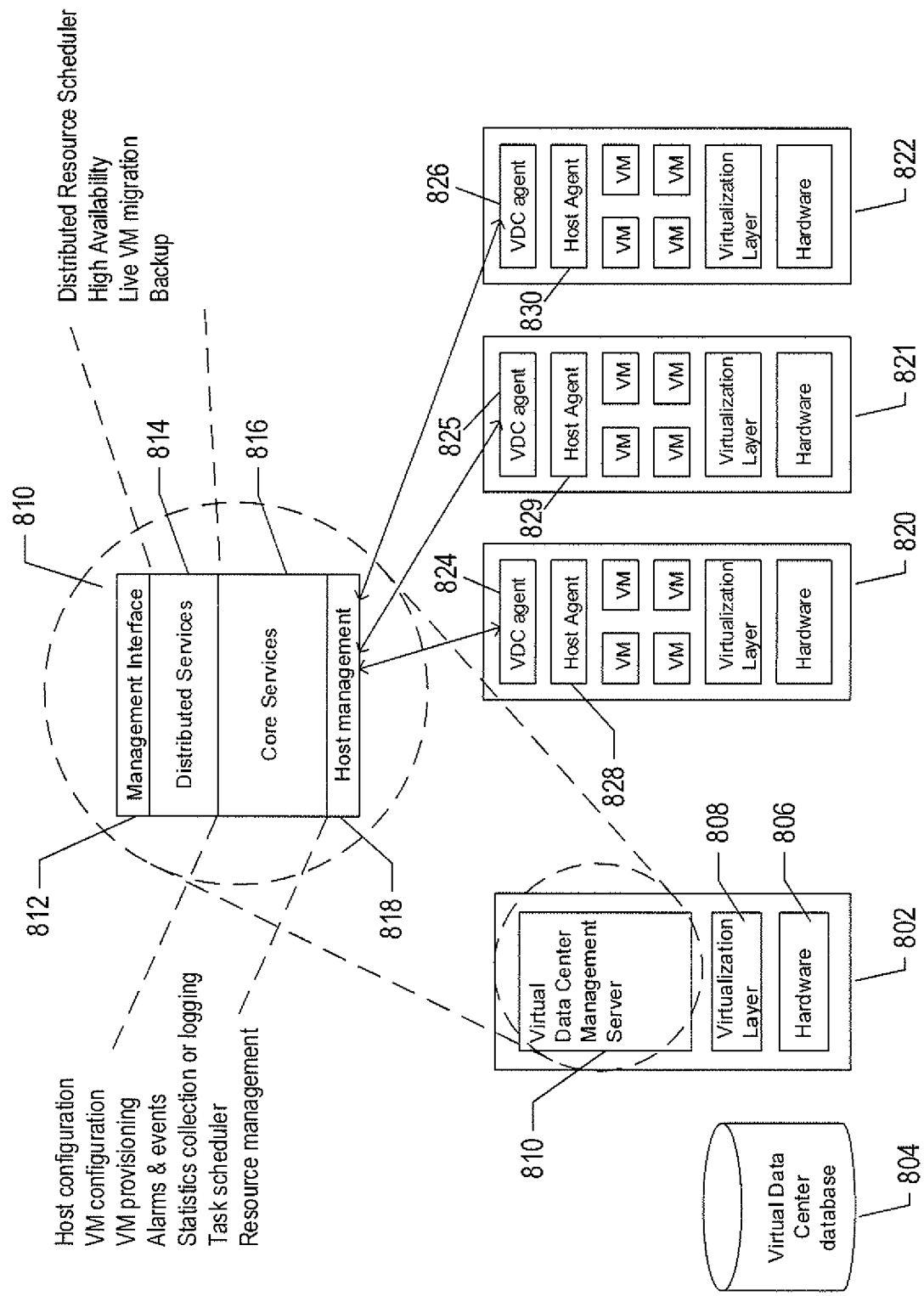
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
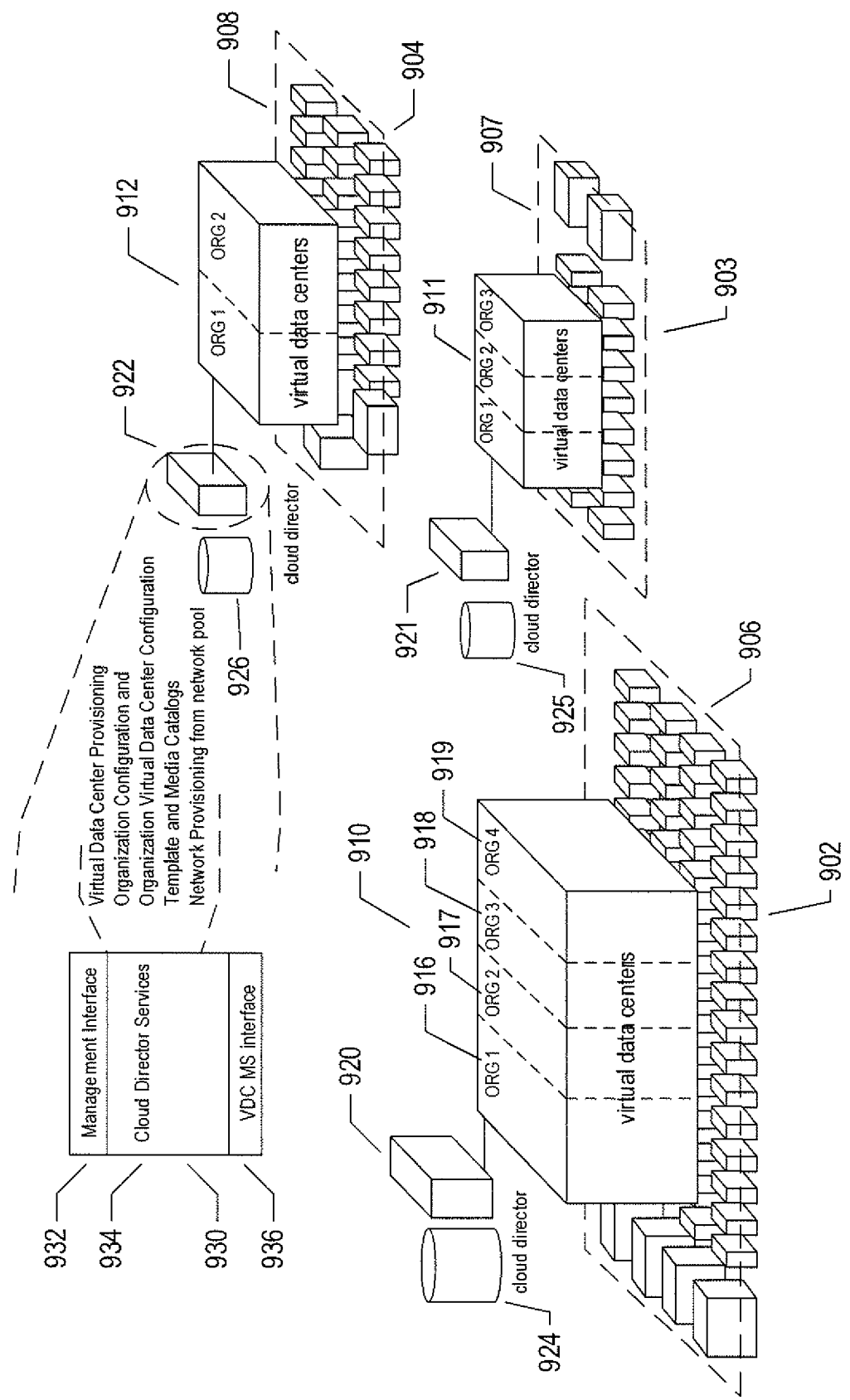
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
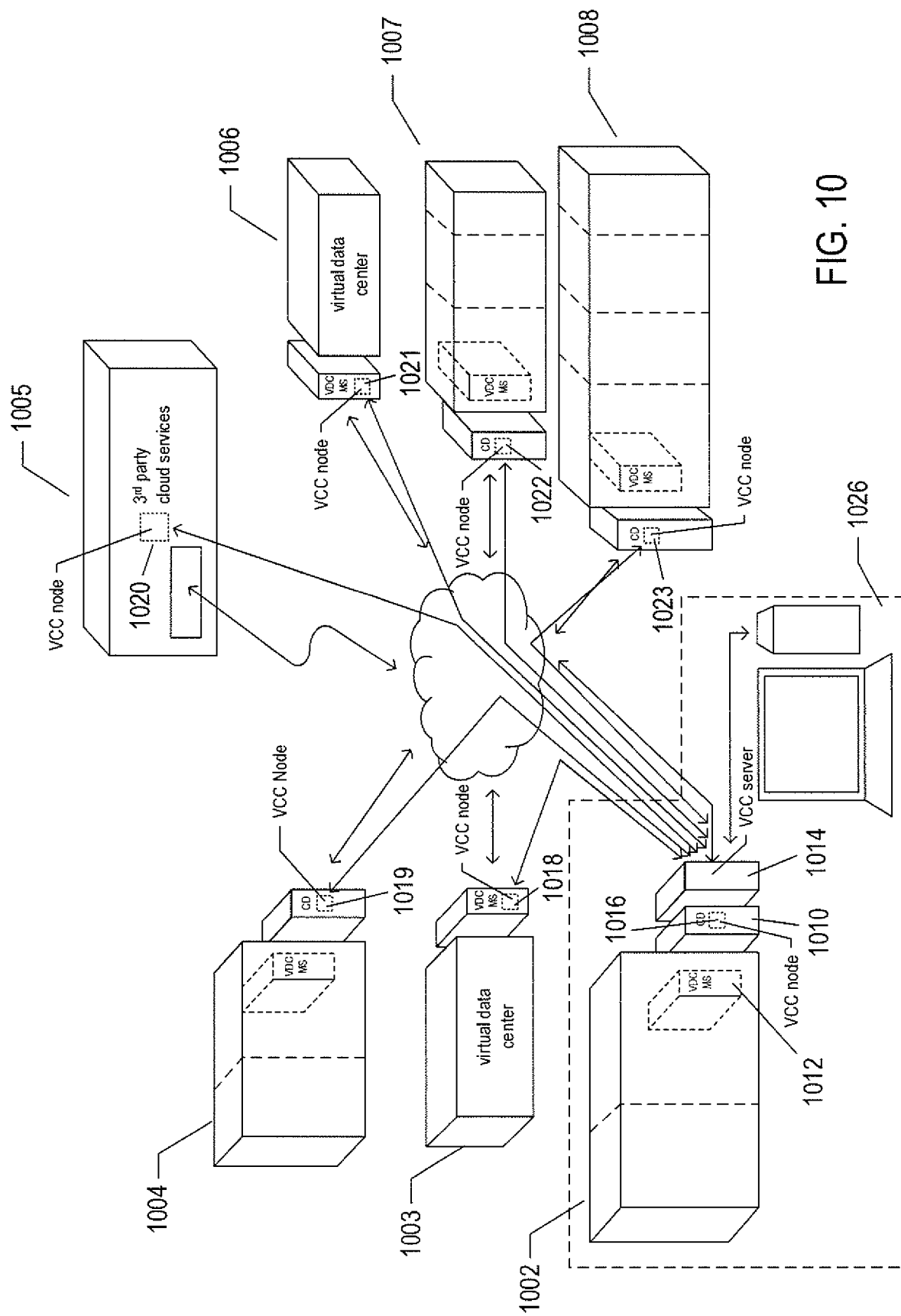
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

Figure 11:
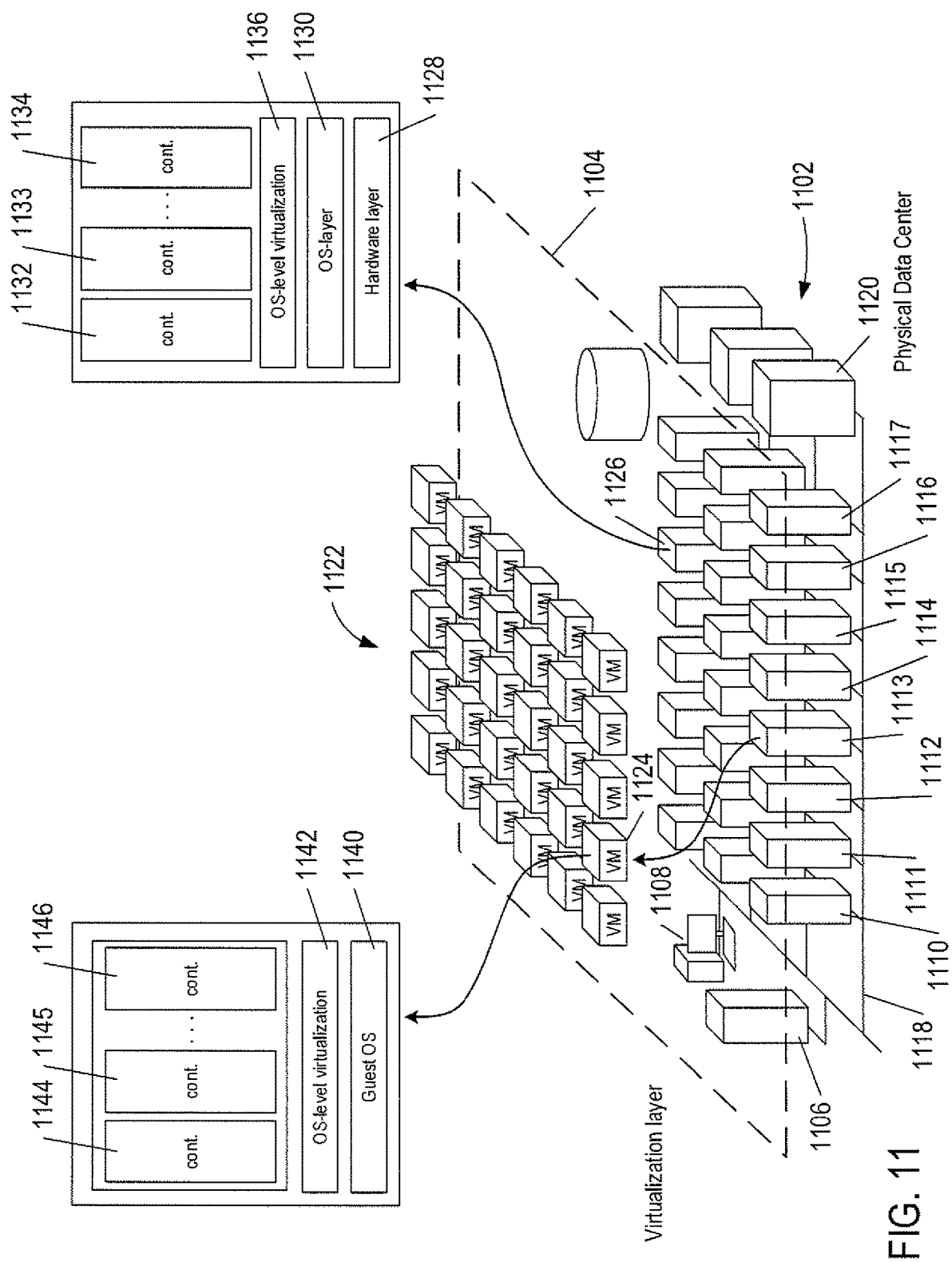
FIG. 11 shows two ways in which operating-system-level virtualization may be implemented in a physical data center.

Another approach to virtualization, as also mentioned above, is referred to as operating-system-level virtualization ("OSL virtualization"). FIG. 11 shows two ways in which OSL virtualization may be implemented in a physical data center 1102. In FIG. 11, the physical data center 1102 is shown below a virtual-interface plane 1104. The physical data center 1102 consists of a virtual-data-center management server 1106 and any of various different computers, such as PCs 1108, on which a virtual-data-center management interface may be displayed to system administrators and other users. The physical data center 1100 additionally includes a number of server computers, such as server computers 1110-1117, that are coupled together by local area networks, such as local area network 1118, that directly interconnects server computers 1110-1117 and a mass-storage array 1120. The physical data center 1102 includes three local area networks that each directly interconnects a bank of eight server computers and a mass-storage array. Certain server computers have a virtualization layer that run multiple VMs 1122. For example, server computer 1113 has a virtualization layer that is used to run VM 1124. Certain VMs and server computers may be used to host a number of containers. A server computer 1126 has a hardware layer 1128 and an operating system layer 1130 that is shared by a number of containers 1132-1134 via an OSL virtualization layer 1136 as described in greater detail below with reference to FIG. 12. Alternatively, the VM 1124 has a guest operating system 1140 and an OSL virtualization layer 1142. The guest operating system 1140 is shared by a number of containers 1144-1146 via the OSL virtualization layer 1142 as described in greater detail below with reference to FIG. 13.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 12:
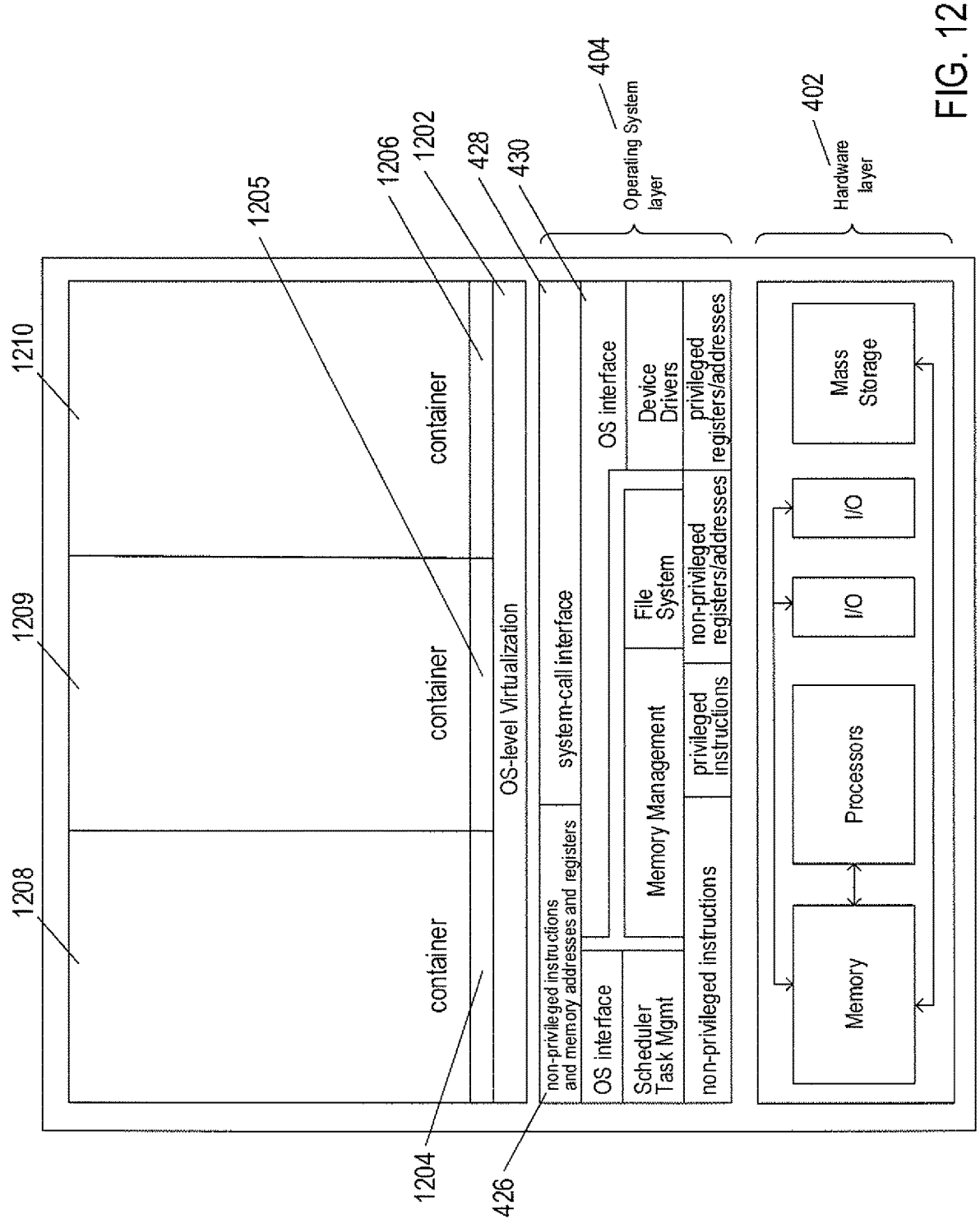
FIG. 12 shows an example server computer used to host three containers.

FIG. 12 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1202 that provides operating-system interfaces 1204-1206 to each of the containers 1208-1210. The containers, in turn, provide an execution environment for an application that runs within the execution environment provided by container 1308. The container can be thought of as a partition of the resources generally available to higher-level computational entities through the operating system interface 430.

Figure 13:
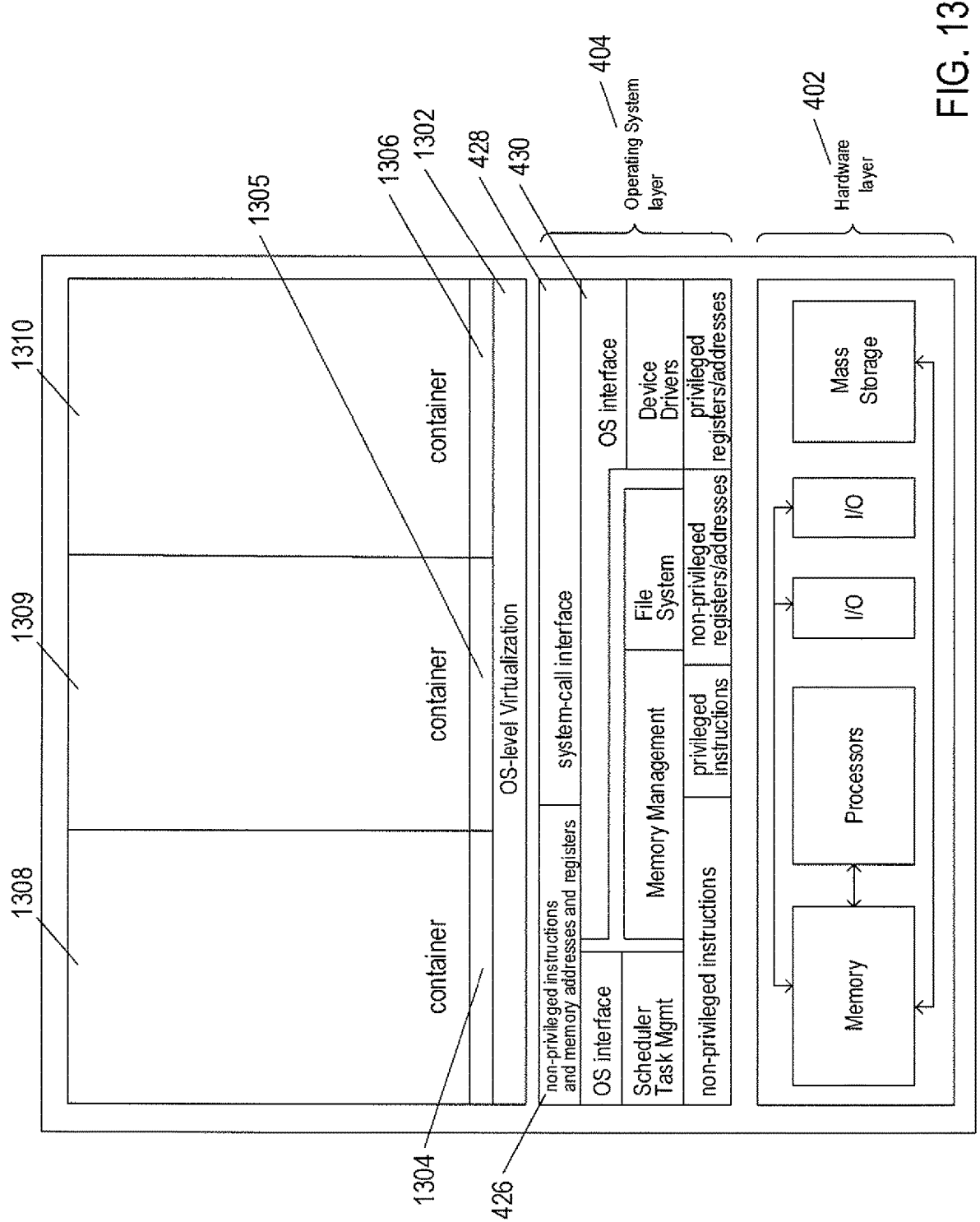
FIG. 13 shows an approach to implementing the containers on a virtual machine.

FIG. 13 shows an approach to implementing the containers on a VM. FIG. 13 shows a host computer similar to that shown in FIG. 5A, discussed above. The host computer includes a hardware layer 502 and a virtualization layer 504 that provides a virtual hardware interface 508 to a guest operating system 1302. Unlike in FIG. 5A, the guest operating system interfaces to an OSL-virtualization layer 1304 that provides container execution environments 1306-1308 to multiple application programs.

Note that, although only a single guest operating system and OSL virtualization layer are shown in FIG. 13, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for miming applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1304 in FIG. 13, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and easy scaling over large numbers of hosts within large distributed computing systems and a simple approach to operating-system upgrades and patches. Thus, the use of OSL virtualization above traditional virtualization in a hybrid virtualized distributed computing system, as shown in FIG. 13, provides many of the advantages of both a traditional virtualization layer and the advantages of OSL virtualization.

Figure 14:
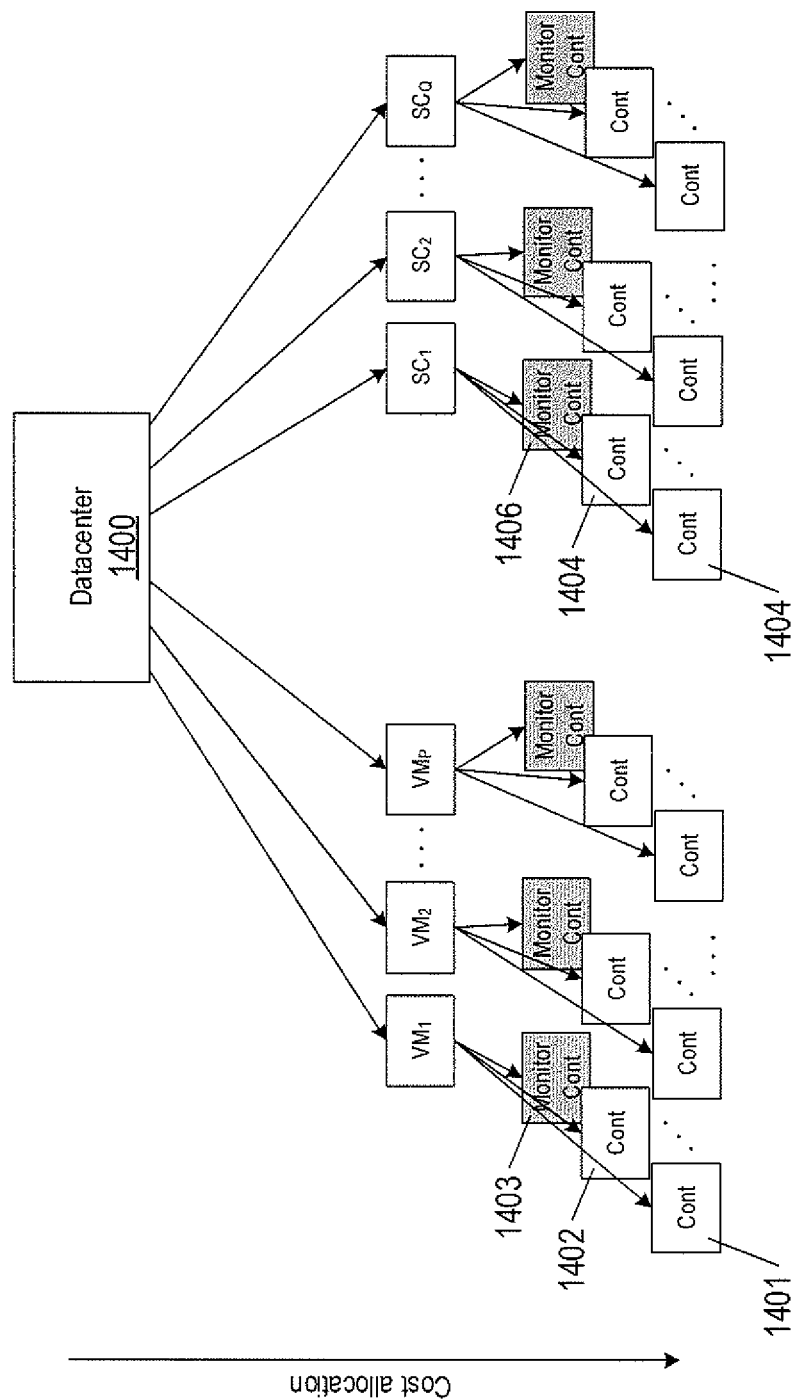
FIG. 14 shows a graph of a data center and hosts of the data center that are used to run applications in containers.

Computational Methods and Systems to Determine Costs of Containers and Attribute the Costs to Applications Running in the Containers FIG. 14 shows a graph of a data center 1400 and hosts of the data center that are used to run applications in containers. The hosts are VMs denoted by $VM_1$, $VM_2$, ..., $VM_P$ and server computers denoted by $SC_1$, $SC_2$, ... $SC_Q$, where P is the number of VMs that host containers and Q is the number of server computers that host containers. The VMs and server computers used to containers form a set of container hosts $$\{host_m\}_{m=1}^{M} = \{VM_p\}_{p=1}^{P} \cup \{SC_q\}_{q=1}^{Q} \quad (1)$$

The total number of hosts (i.e., total number of VMs and server computers) used to run containers in the data center 1400 is M=P+Q. In FIG. 14, each of the VMs and the server computers runs containers denoted by "Cont," and one of the containers that runs on each host is a monitor container denoted by "Monitor Cont." A monitor container collects, aggregates, processes, and exports information about the other containers use of host resources. The host resources used by the container include, but are not limited to, CPU, memory, network interface, and I/O. For example, monitor container 1403 maintains a record of much of the resources provided by $VM_1$ are used by the containers 1401 and 1402.

Let $N_m$ represent the number of containers running on the mth host of the set of M hosts in the data center 1400. A container resource utilization quantity of the mth host is represented by:

$$u_{n,r}(T_k) \quad (2)$$

where n is a container index n=1, ..., $N_m$;

r represents a host resource (e.g., r=CPU, memory, storage, network interface, I/O, etc.); and $T_k=[t_{k-1}, t_k]$ is a time interval in which utilization of the resource by the container is monitored and recorded by the monitor container running on the same host.

The monitor container running on a host may be used to generate the container resource utilization quantities $u_{n,r}(T_k)$ for each container running on the host and for one or more resources used by the containers.

FIGS. 15A-15B show histograms of CPU and memory utilization, respectively, by a container running on a host. In FIGS. 15A and 15B, horizontal axes 1501 and 1502 represent time. In FIG. 15A, vertical axis 1503 represents CPU utilization of the host in GHz, and in FIG. 15B, vertical axis 1504 represents memory utilization of the host in GB. The host may be a VM or a server computer. Each vertical bar represents an amount of resource utilization within a time interval determined by a monitor container also running on the host. For example, vertical bar 1506 represents utilization of the host CPU by the container within the time interval $T_k$. Vertical bar 1508 represents utilization of host memory by the container within the same time interval $T_k$.

Each VM and server computer that hosts one or more containers in the data center 1400 has a resource utilization rate given by $$rate_{m,r} \quad (3)$$

where in is a host index m=1, ..., M.

The units of the resource utilization rate is a ratio of monetary unit to the unit associated with the resource. For example, the CPU utilization rate may have monetary units of dollars to GB (i.e., $/GB) and the memory utilization rate may have monetary units of dollars to GHz (i.e., $/GHz). The resource utilization rates may be determined by data center business management software that meters utilization of VMs and server computers and calculates the resource utilization rates of VM and server computer resources, such as vRealize Business Management Standard.

FIG. 16 shows a table of hosts and examples of associated memory and CPU utilizations rates and examples of memory and CPU utilization over a time interval. Column 1601 shows a list the hosts composed of the set of VMs $\{VM_p\}_{p=1}^{P}$ and the set of server computers $\{SC_q\}_{q=1}^{Q}$ in FIG. 14. Columns 1602 and 1604 list examples of memory and CPU utilization rates for each of the hosts listed in column 1601. Columns 1603 and 1605 list examples of memory and CPU utilization of a container running on each host over a time interval. For example, row 1606 represents the memory and CPU utilization rates of $VM_1$ and memory utilization and CPU utilization of a container running on $VM_1$ over a time interval. The memory utilization rate is $\text{rate}_{1,mem}=21.32\$/GB$; the memory utilization is $u_{1,mem}(T_k)=2.4$ GB; the CPU utilization rate is $\text{rate}_{1,CPU}=51.74\$/$GHz; and the CPU utilization is $u_{1,CPU}(T_k)=0.27$ GHz.

Containers provide flexibility for software development and deployment, which enables containers to be moved from one host another host within a data center. Containers can be moved between VMs, between server computers, and between VMs and server computers.

Figure 17:
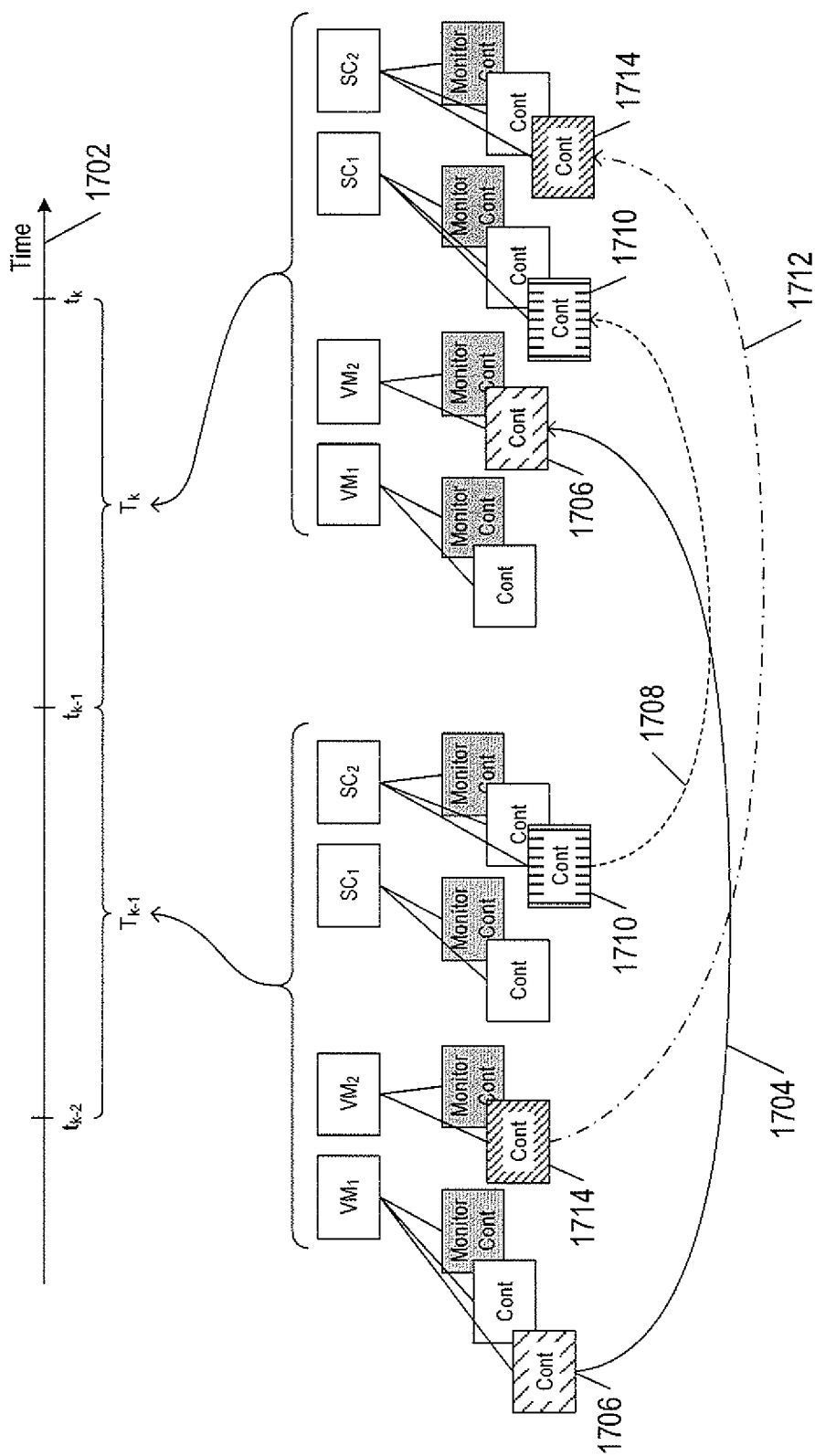
FIG. 17 shows an example of containers moved between hosts in a data center.

FIG. 17 shows an example of containers moved between hosts in a data center. In FIG. 17, the set of hosts is composed of two VMs $VM_1$ and $VM_2$ and two server computers $SC_1$ and $SC_2$. Each host includes a monitor container and at least one other container. FIG. 17 also includes a time axis 1702 with two time intervals denoted by $T_{k-1}$ and $T_k$. Directional arrow 1704 shows a container 1706 that is run on $VM_1$ in the time interval $T_{k-1}$ and moved to run on $VM_2$ in the time interval $T_k$. Directional arrow 1708 shows a container 1710 that is run on $SC_2$ in the time interval $T_{k-1}$ and moved to run on $SC_1$ in the time interval $T_k$. Directional arrow 1712 shows a container 1714 that is run on $VM_2$ in the time interval $T_{k-1}$ and moved to run on $SC_2$ during the time interval $T_k$.

A direct container cost is calculated in time intervals for each container running in the data center. The direct container cost of each container running on the mth host is calculated as a sum of direct costs of resources used by the container:

$$\text{dir container cost}_{m,n}(T_k) = \sum_r \text{dir resource cost}_{m,n,r}(T_k) \quad (4)$$

where $\text{dir resource cost}_{m,n,r}(T_k)$ is the direct cost of the rth resource of the mth host used by the nth container in a time interval $T_k$.

The direct cost of a resource used by a container is calculated according to $$\text{dir resource cost}_{m,n,r}(T_k) = u_{n,r}(T_k) \times \text{rate}_{m,r} \quad (5)$$

An indirect container cost of using the rth resource of the mth host in the time interval $T_k$ by the nth container is calculated based on resource utilization of the host and the monitor container. The host resource utilization in the time interval $T_k$ is represented by $$\text{host } u_{m,r}(T_k) \quad (6)$$

The host resource utilization is generated by a virtual resource management tool or a data resource management tool. The monitor container running on a host also generates a monitor container resource utilization of the rth resource of the host by the monitor container in the time interval $T_k$ $$mcu_{m,r}(T_k) \quad (7)$$

The host overhead cost of the rth resource is given by $$\text{host overhead}_{m,r}(T_k) = \text{rate}_{m,r} \times (\text{host } u_{m,r}(T_k) + mcu_{m,r}(T_k)) \quad (8)$$

The indirect cost of the rth resource of the mth host used by the nth container in a time interval $T_k$ is calculated according to $$\text{indir resource cost}_{m,n,r}(T_k) = f_{n,r}(T_k) \times \text{host overhead}_{m,r}(T_k) \quad (9)$$

where $f_{n,r}(T_k)$ is the fraction of the rth resource indirectly used by the nth container and is determined by $$f_{n,r}(T_k) = u_{n,r}(T_k) \Big/ \left( \sum_{n=1}^{N_m} u_{n,r}(T_k) \right) \quad (10)$$

The indirect container cost of the nth container running on the mth host is calculated as a sum of indirect costs of resources of the mth host as follows:

$$\text{indir container cost}_{m,n}(T_k) = \sum_r \text{indir resource cost}_{m,n,r}(T_k) \quad (11)$$

A total container cost of the nth container running on the mth host is calculated as a sum of the direct and indirect container costs of Equations (5) and (11) as follows:

$$\text{total container cost}_{m,n}(T_k) = \text{dir container cost}_{m,n}(T_k) + \text{indir container cost}_{m,n}(T_k) \quad (12)$$

The total container cost of a container may also be calculated over a time period composed of a number of time intervals as follows:

$$\text{total container cost}_{m,n}(\text{time period}) = \sum_k \text{total container cost}_{m,n}(T_k) \quad (13)$$

An aggregated cost of containers running on the M hosts in the data center in the time interval $T_k$ is given by:

$$\text{agg container cost}(T_k) = \sum_{m=1}^{M} \sum_{n=1}^{N_m} \text{total container cost}_{m,n}(T_k) \quad (14)$$

An aggregated cost container may also be calculated over a time period composed of a number of time intervals as follows:

$$\text{agg container cost}(\text{time period}) = \sum_k \sum_{m=1}^{M} \sum_{n=1}^{N_m} \text{total container cost}_{m,n}(T_k) \quad (15)$$

After a total container cost is calculated for each container running in the data center as described above with reference to Equation (12), the total container costs of the containers are attributed to the one or more applications running in the containers. The applications running in one or more containers may be determined using an application performance management tool.

Figure 18B:
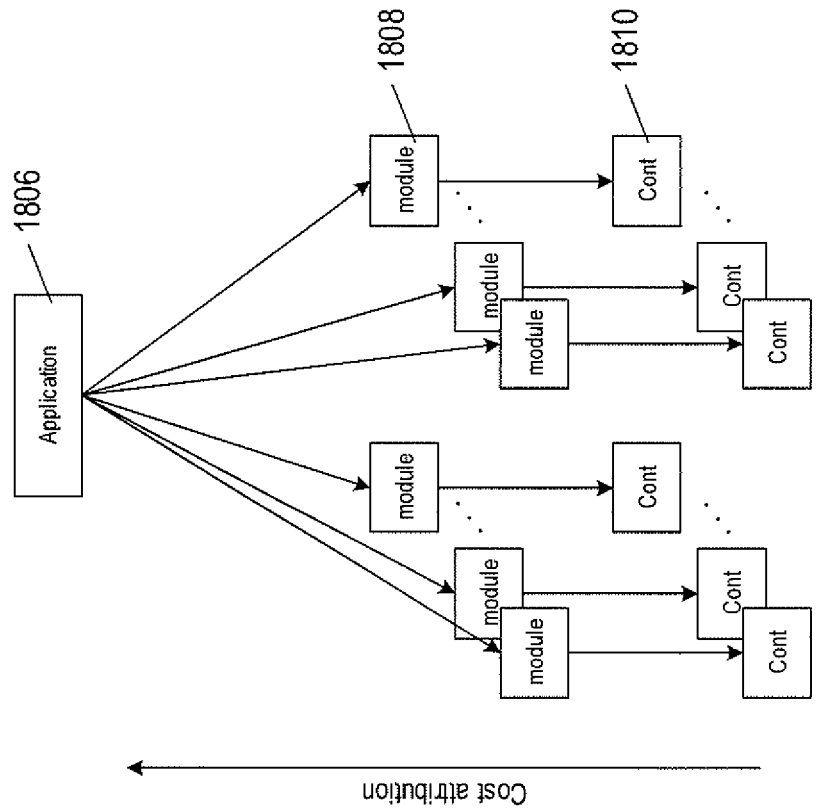
FIGS. 18A-18C show three different ways in which applications may be run in containers.
Figure 18A:
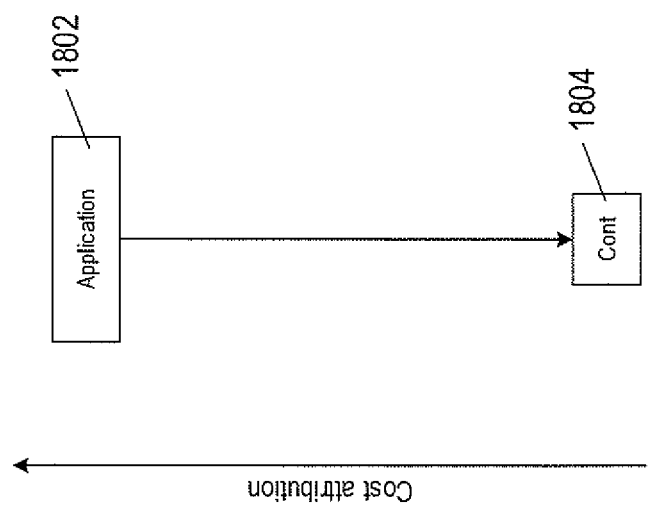
Figure 18C:
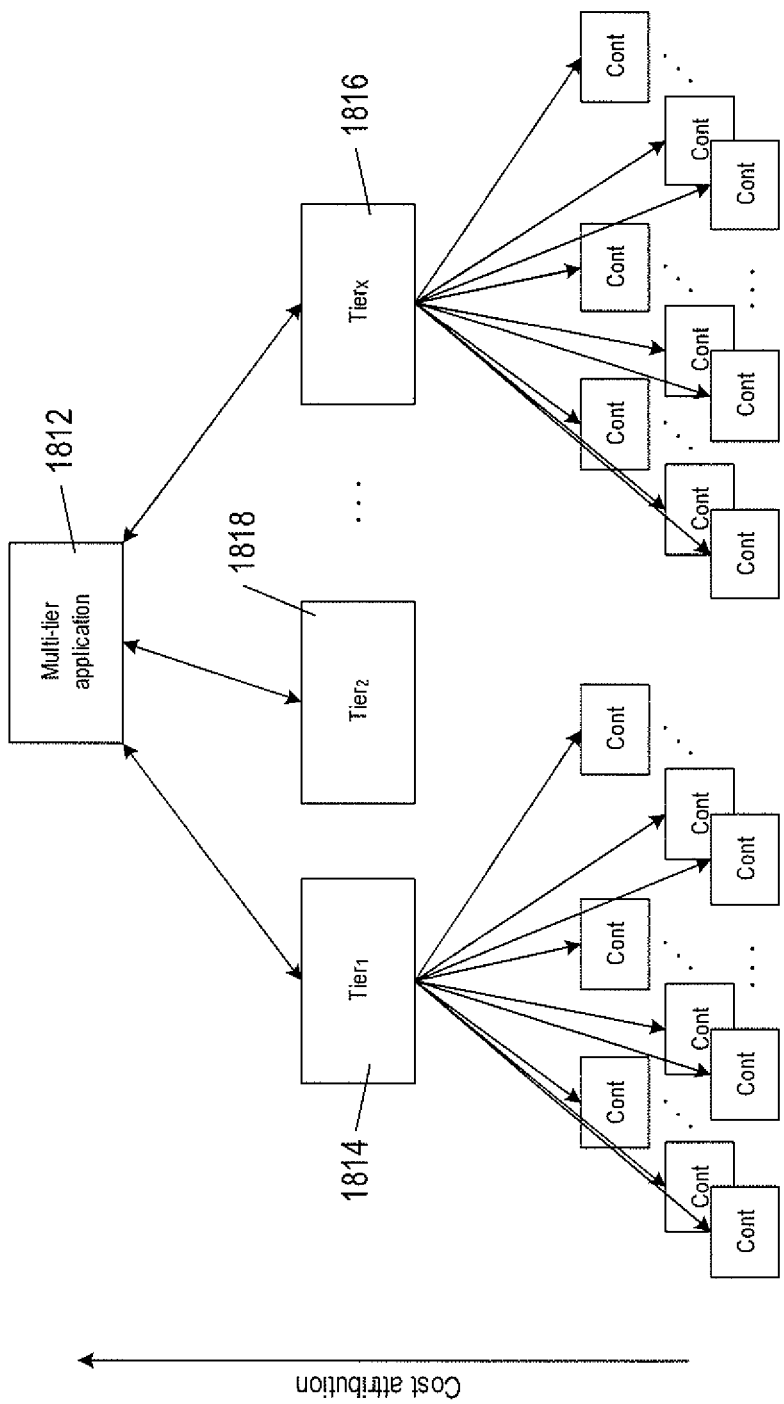

FIGS. 18A-18C show three different ways in which applications may be run in containers. In FIG. 18A, a container 1804 is used to run a single application 1802. In this case, the cost of the application 1802 is the total container cost of the container 1804 given by:

$$\text{application cost}(T_k) = \text{total container cost}_{m,n}(T_k) \quad (16)$$

In FIG. 18B, a single application 1806 is divided into modules, such as module 1808. Each module of the application is a separate software component of the application. In the example of FIG. 18B, each module is developed and run in a container. For example, the module 1808 is developed and run in a container 1810. In this case, the cost of the application 1806 is calculated as a sum of total container costs of the containers used to develop and run the modules of the application. Let $N_c$ represent the number of containers used to run the modules that form the application, and let $M_c$ represent the number of hosts used to run the containers that are in turn used to run the modules of the application. The application is cost calculated as follows:

$$\text{application cost}(T_k) = \sum_{m'=1}^{M_c} \sum_{n'=1}^{N_c} \text{total container cost}_{m',n'}(T_k) \quad (17)$$

where n' an index of the containers used to run each module of the application; and m' is an index of the hosts used to run the containers.

In FIG. 18C, a multi-tier application 1812 is developed and deployed in a number of containers. The multi-tier application 1812 is a client-server architecture in which presentation, application processing, and data management functions are physically separated into tiers. In the example of FIG. 18C, the multi-tier application is physical separated into X different tiers. Certain tiers, such as tiers 1814 and 1816, are executed in containers. While other tiers, such as tier 1818, support the multi-tier application but are not executed using containers. In this case, the cost of the multi-tier application 1812 is calculated as a sum of the total container costs of the containers used to execute tiers and the cost of tiers not executed using containers as follows:

$$\text{multitier app cost}(T_k) = \quad (18)$$
$$\sum_{tier \in Z} \text{tier container cost}_{tier}(T_k) + \sum_{tier \in Z'} \text{tier cost}_{tier}$$

where

Z is the set of tiers executed with containers;

Z' is the set of tiers not executed with containers;

tier container cost$_{tier}(T_k)$ is the cost of a tier executed with containers;

tier cost$_z$ is the cost of a tier not executed with containers; and

Z∪Z' is set of tiers used to execute the multi-tier application.

In Equation (14), the first summation is the cost of tiers executed in containers and the second summation is the cost of tiers not executed with containers. The tier container cost is calculated by summing total container cost of the container used to execute the tier $$\text{tier container cost}_{tier}(T_k) = \sum_{m,n \in tier} \text{total container cost}_{m,n}(T_k) \quad (19)$$

where m, n∈tier represents total container cost of containers of Equation (12) used to execute the tier of the application.

Figure 19:
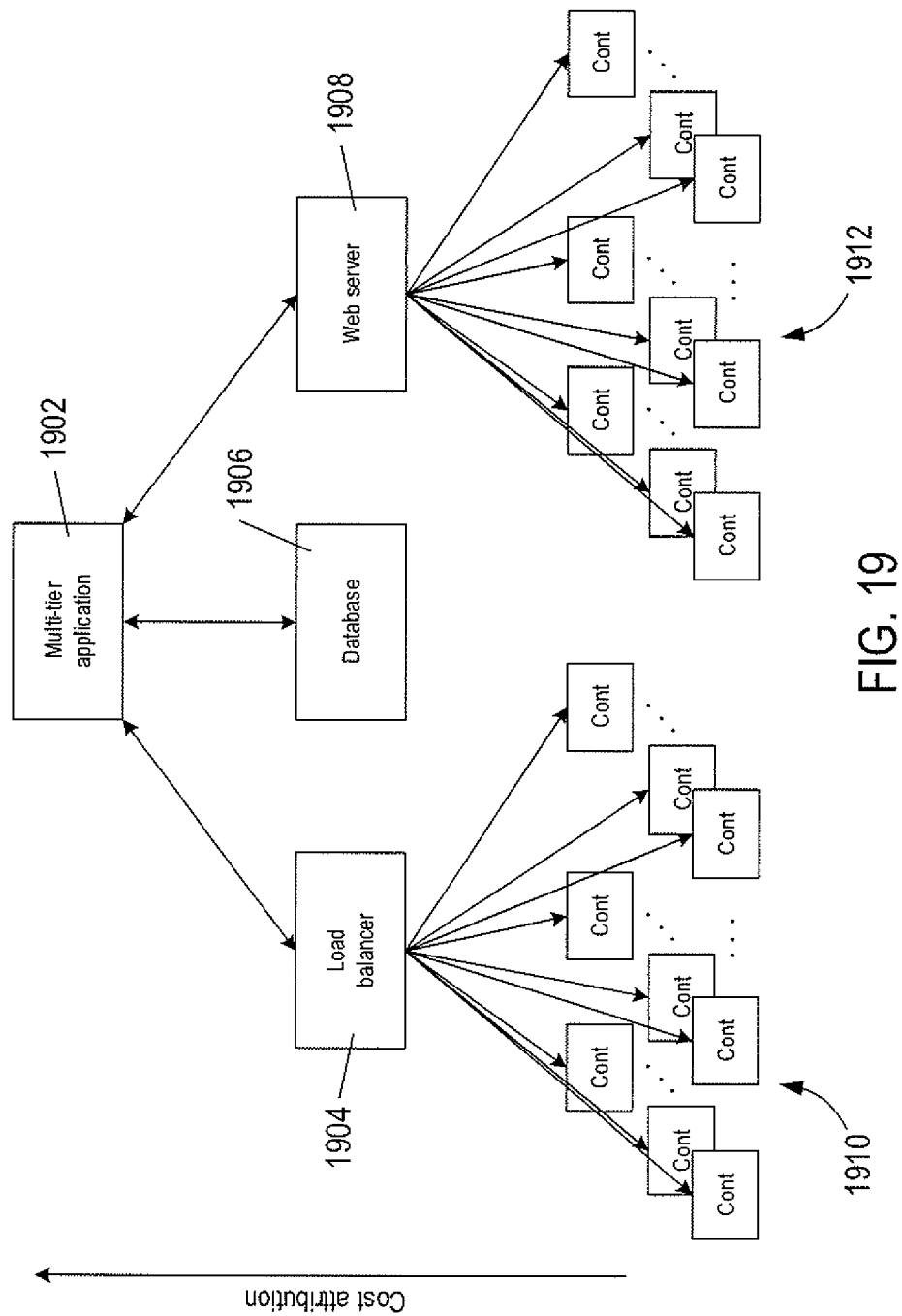
FIG. 19 shows an example of a multi-tier application run using a load balancer, a database, and a web server.

FIG. 19 shows an example of a multi-tier application 1902 run using a load balancer 1904, a database 1906, and a web server 1908. As shown in FIG. 19, the load balancer 1904 and the web server 1908 are executed using containers, while the database 1906 is not executed using containers. The cost of the multi-tier application 1902 is calculated as follows:

$$\text{multitier app cost}(T_k) = \text{load balancer cost}(T_k) + \quad (20)$$
$$\text{web server cost}(T_k) + \text{database cost}$$

where load balancer cost $(T_k)$ is the cost of the load balancer;

web server cost $(T_k)$ is the cost of the web server; and database cost is the cost of the data base.

The cost of the load balancer is calculated as follows:

$$\text{load balancer cost}(T_k) = \sum_{cont \in LB} \text{total container cost}_{cont}(T_k) \quad (21)$$

where LB is the set of containers 1910 used to execute the load balancer 1904.

The cost of the web server is calculated as follows:

$$\text{web server cost}(T_k) = \sum_{cont \in WS} \text{total container cost}_{cont}(T_k) \quad (22)$$

where WS is the set of containers 1912 used to execute the web server 1908.

Figure 20:
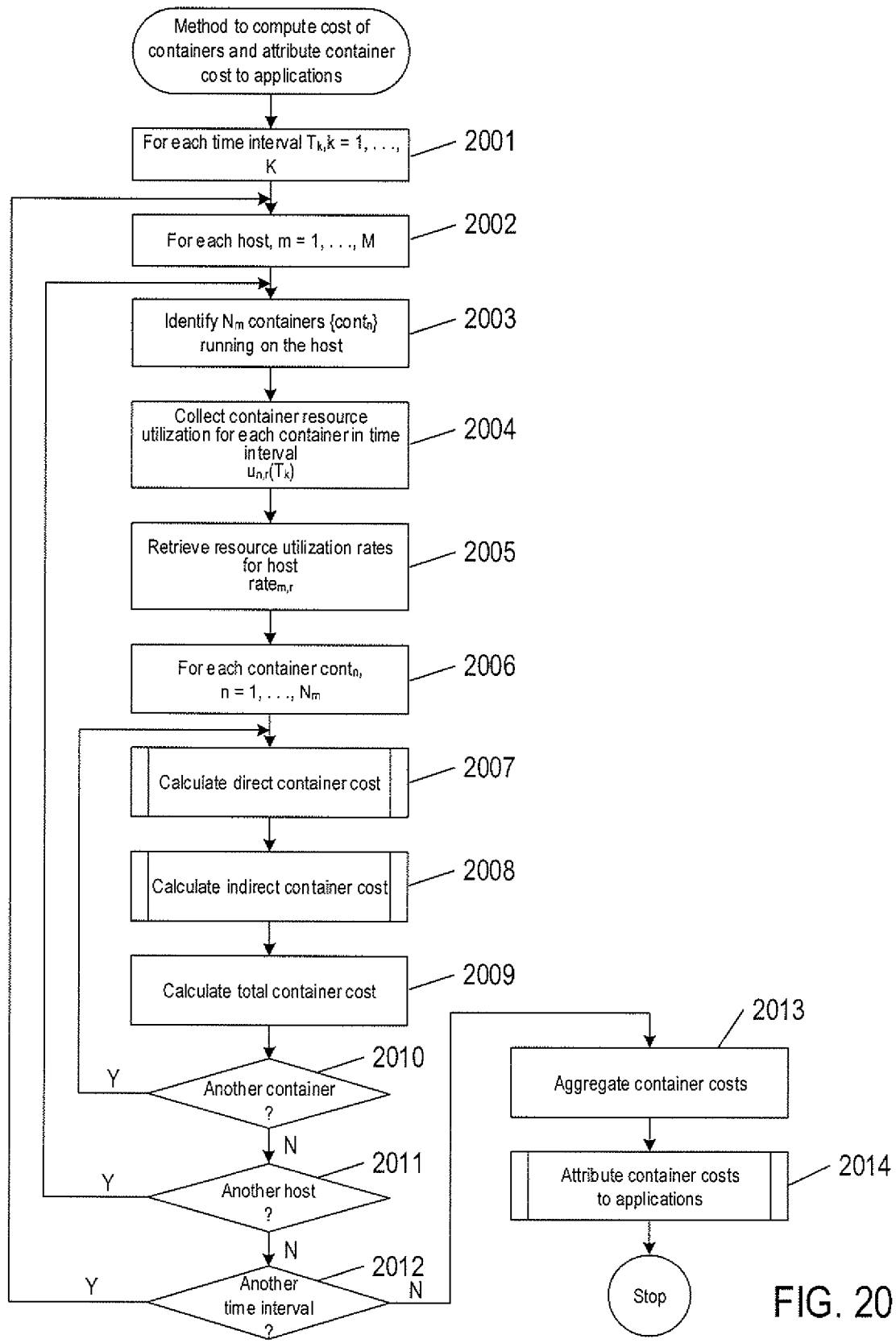
FIG. 20 shows a flow-control diagram of a method to compute cost of containers and attribute container costs to applications.

FIG. 20 shows a flow-control diagram of a method to compute cost of containers and attribute container costs to applications. A for-loop beginning with block 2001 repeats the computational operations represented by blocks 2002-2012 for each time interval. A for-loop beginning with block 2002 repeats the computational operations represented by blocks 2003-2011 for each host used to run containers in a data center. In block 2003, the containers running on a host in the time interval are identified. In block 2004, container resource utilization of the host by the containers running on the host are collected/received from the monitor container running on the same host, as described above with reference to Equation (2). In block 2005, resource utilization rates are retrieved for each host as described above with reference to Equation (3) and FIG. 16. A for-loop beginning with block 2006 repeats the computational operations represented by blocks 2007-2009 for each container running on the host. In block 2007, a routine "calculate direct container cost" is called to calculate the direct container cost of each container running on the host. In block 2008, a routine "calculate indirect container cost" is called to calculate the indirect container cost of each container running on the host. In block 2009, the direct container cost and the indirect container cost are summed to calculate the total container cost of the container as described above with reference to Equation (12). In decision block 2010, when the total container cost has been calculated for each container, control flows to decision block 2011. In decision block 2011, when all the hosts running containers have been considered, control flows to decision block 2011. In decision block 2012, the computational operations represented by blocks 2002-2011 are repeated for another time interval. In block 2013, an aggregated container cost is calculated according to one or both of Equations (14) and (15). In block 2014, a routine "attribute container costs to application" is called to determine the cost of applications based on the total container costs of the containers used to develop and run the applications.

FIG. 21 shows a flow-control diagram of the routine "calculate direct container cost" called in block 2007 of FIG. 20. A for-loop beginning with block 2101 repeats the computational operation represented by block 2102 for each resource of a host used by the container. In block 2102, direct cost of a resource is calculate as described above with reference to Equation (5). In decision block 2103, when the direct cost of each resource is calculated, control flows to block 2104 in which the direct cost of the resources are summed to generate the direct container cost as described above with reference to Equation (4).

FIG. 22 shows a flow-control diagram of the routine "calculate indirect container cost" called in block 2008 of FIG. 20. A for-loop beginning with block 2201 repeats the computational operations represented by blocks 2202-2207. In block 2202, host resource utilization in the time interval is determined as described above with reference to Equation (6). In block 2203, monitor container resource utilization is determined in the time interval as described above with reference to Equation (7). In block 2204, host overhead resource cost is calculate based on the resource utilization rate and the host and monitor container resource utilizations, as described above with reference to Equation (8). In block 2205, a fraction of the resource used by the container is calculated as described above with reference to Equation (9). In block 2206, indirect resource cost is calculated based on the fraction of the resource used and the host overhead, as described above with to Equation (9). In block 2207, when the indirect resource cost has been calculated for each resource, control flows block 2208 in which the indirect container cost is calculated as described above with reference to Equation (11).

Figure 23:
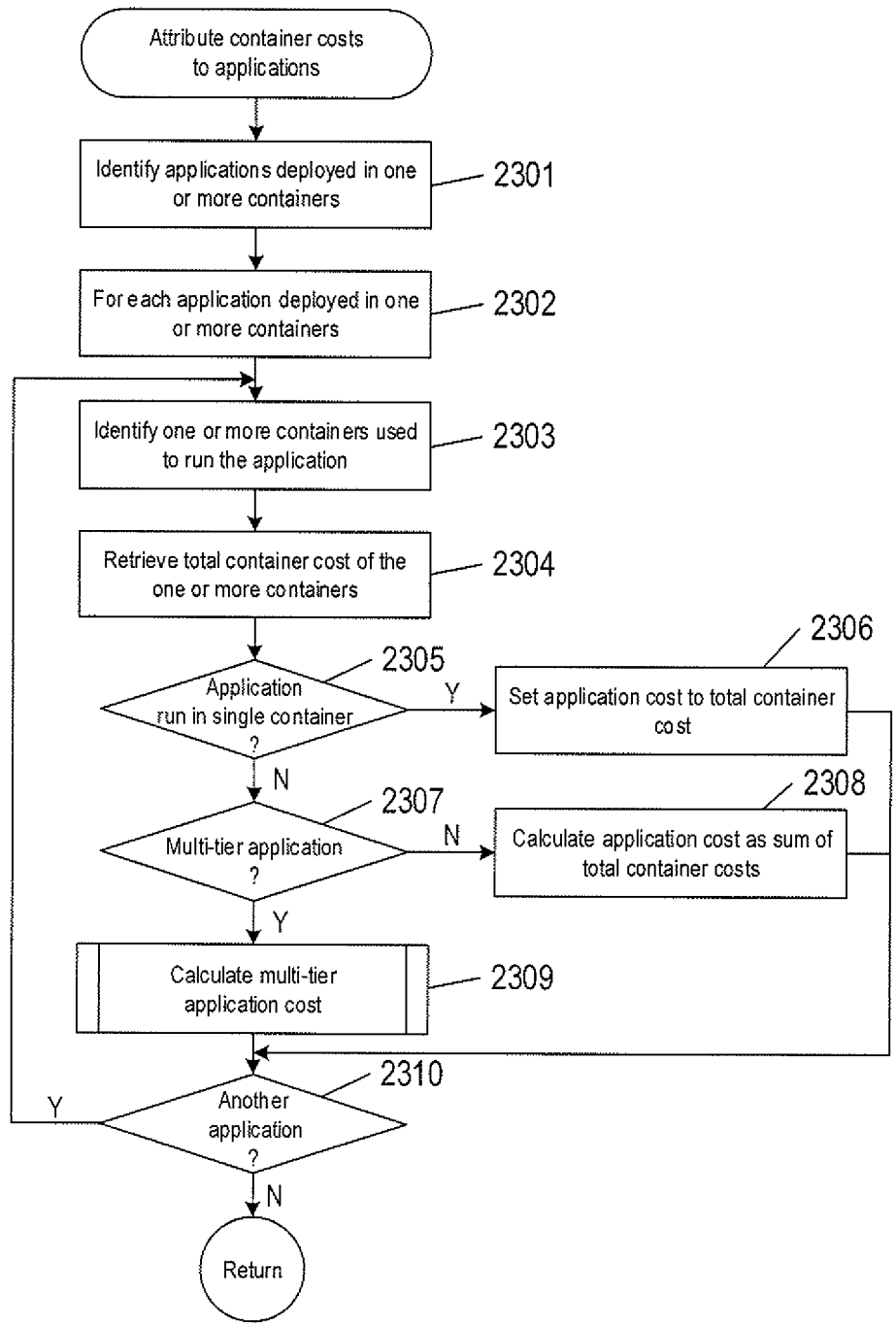
FIG. 23 shows a flow-control diagram of the routine "attribute container costs to applications" called in FIG. 20.

FIG. 23 shows a flow-control diagram of the routine "attribute container costs to applications" called in block 2014 of FIG. 20. In block 2301, applications deployed in one or more containers of the data center are identified. A for-loop beginning with block 2302 repeats the computation operations represented by blocks 2303-2305. In block 2303, one or more containers used to run the application are determined. In block 2304, the total container cost of each of the containers determined in block 2303 are retrieved. In decision block 2305, if the application is developed and/or run in a single container, control flows to block 2306 in which the total container cost of the container running the application is assigned to the application cost, as described above with reference to Equation (16). In decision block 2307, if the application is modularized or otherwise distributed over a number of containers, but is not a multi-tier application, control flows to block 2308. In block 3208, the total container costs of the containers used to develop and/or execute the application are summed to generate the application cost according to Equation (17). Otherwise, in decision block 2307, if the application is a multi-tier application, control flows to block 2309 in which a routine "calculate multi-tier application cost" is called. In decision block 2310, computational operations represented by blocks 2303-2309 are repeated for another application.

Figure 24:
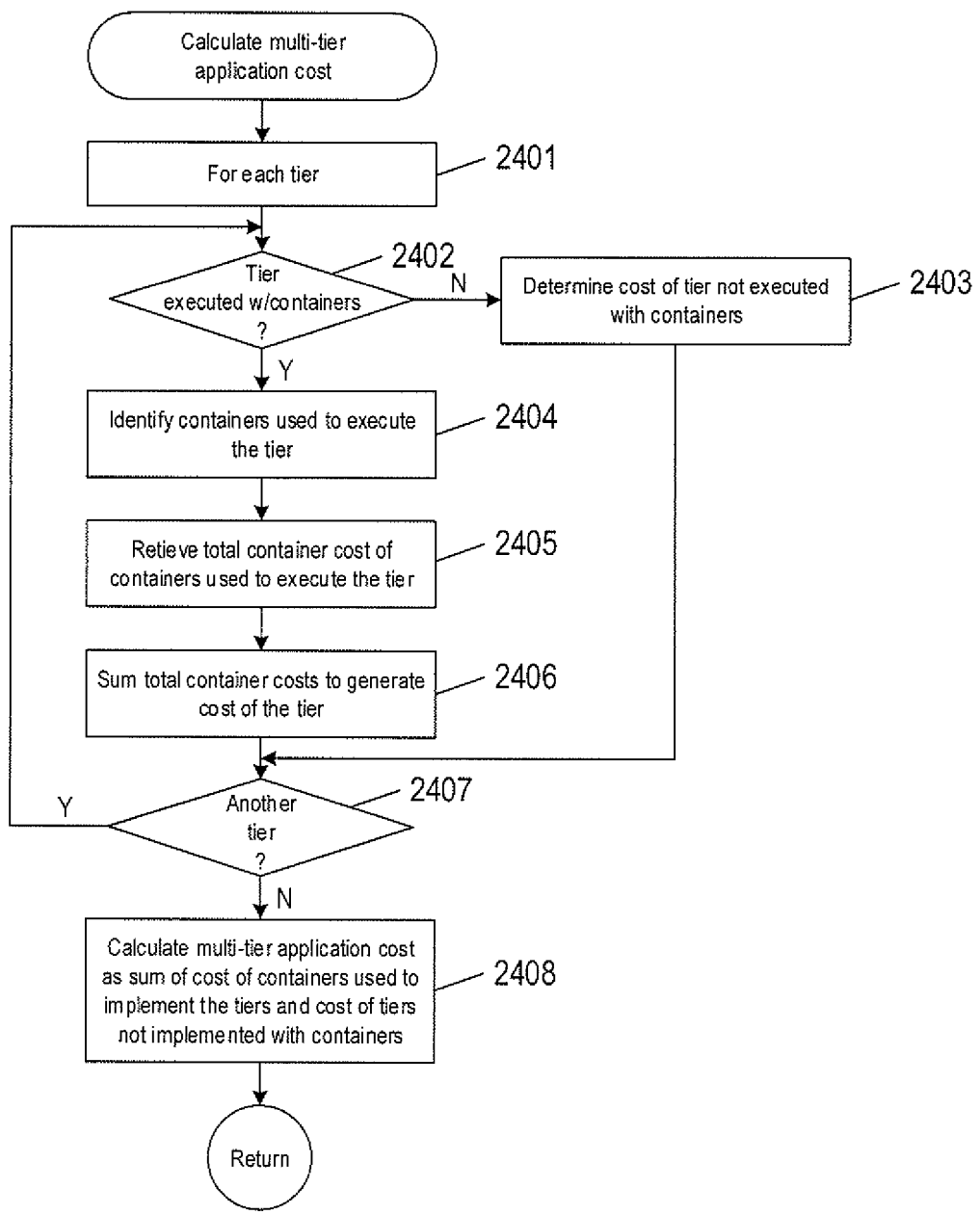
FIG. 24 shows a flow-control diagram of the routine "calculate multi-tier application cost" called in FIG. 23.

FIG. 24 shows a flow-control diagram of the routine "calculate multi-tier application cost" called in block 2309 of FIG. 23. A for-loop beginning with block 2401 repeats the computational operations represented by blocks 2402-2407 for each tier of the application. In decision block 2402, when a tier of the application is executed in containers, control flows to block 2404. Otherwise, control flows to block 2403.

In block 2403, cost of a tier not executed with containers is determined. In block 2404, containers used to execute the tier are identified. In block 2405, total container cost of the containers used to execute the tier are retrieved from storage. In block 2405, the total container cost of the containers are summed to generate the tier container cost as described above with reference to Equation (18). In decision block 2407, all of the tiers of the multi-tier application have been considered, the control flows to block 2408. In block 2408, the cost of the multi-tier application is calculated as described above with reference to Equation (18).

Although the above disclosure is described in terms of particular implementations, it is not intended that the disclosure not be limited to these implementations. Modifications within the spirit of the disclosure will be apparent to those skilled in the art. For example, any of a variety of different implementations can be obtained by varying any of many different design and development parameters, including programming language, underlying operating system, modular organization, control structures, data structures, and other such design and development parameters. Thus, the present disclosure is not intended to be limited to the embodiments shown herein but is to be accorded the widest scope consistent with the principles and novel features disclosed herein.

The invention claimed is:

1. A method to calculate a total container cost of a container of a data center, the method comprising:
    calculating a direct container cost of the container based on container resource utilization and a resource utilization rate of resources of a host;
    calculating an indirect container cost of the container as a sum of indirect cost of resources of the host used by the container and resources of the host used by a monitor container that monitors the container resource utilization of host resources;
    calculating a total container cost of the container as a sum of the direct container cost and the indirect container cost of the container;
    identifying an application that is at least partially deployed in the container;
    determining that the application is a multi-tier application based on the application having a first tier and a second tier, the container being used to execute the first tier of the application;
    retrieving from memory a cost of the second tier of the application that does not use a respective container; and
    generating a cost of the application based on the total container cost associated with the first tier and the cost of the second tier of the application.

2. The method of claim 1, wherein calculating the direct container cost of the container further comprises:
    for the resources of the host used by the container,
        retrieving the container resource utilization of the resource of the host used by the container from the monitor container that runs on the host;
        retrieving the resource utilization rate of the resource used by the container;
        calculating a direct cost of the resource as a product of the container resource utilization and the resource utilization rate; and
        calculating the direct container cost of the container as a sum of the direct cost of resources used by the container.

3. The method of claim 1, wherein calculating the indirect container cost further comprises:
for the resources of the host used by the container,
determining a host resource utilization of the resource;
determining a monitor container resource utilization of the resource used by the monitor container;
calculating a host overhead resource cost as a sum of the host resource utilization and the monitor container resource utilization multiplied by the resource utilization rate;
calculating a fraction of the resource used by the container;
calculating an indirect cost of the resource used by the container as a product of the fraction of the resource used by the container and the host overhead resource cost; and
calculating the indirect container cost of the container as the sum of the indirect costs of the resources.

4. The method of claim 1, further comprising:
when the application is run in a single container, assigning the total container cost of the container as a cost of the application; and
when the application is composed of modules run in two or more containers, summing the total container costs of the two or more containers to generate the cost of the application.

5. The method of claim 1, wherein the resource further comprises one or more of CPU, memory, storage, network interface, and input-output of the host.

6. The method of claim 1 further comprising summing the total container costs in a time interval to generate an aggregated container cost of the containers that run in the data center during the time interval.

7. The method of claim 1, wherein the host further comprises one or more of virtual machines and server computers.

8. A system to calculate container costs and attributed container cost to applications run in a data center, the system comprising:
one or more processors;
one or more data-storage devices; and
machine-readable instructions stored in the one or more data-storage devices that when executed using the one or more processors control the system to carry out:
calculating a direct container cost of a container based on container resource utilization and a resource utilization rate of resources of a host;
calculating an indirect container cost of the container as a sum of indirect cost of resources of the host used by the container and resources of the host used by a monitor container that monitors the container resource utilization of host resources;
calculating a total container cost of the container as a sum of the direct container cost and the indirect container cost of the container;
identifying an application that is at least partially deployed in the container;
determining that the application is a multi-tier application based on the application having a first tier and a second tier, the container being used to execute the first tier of the application;
retrieving from memory a cost of the second tier of the application that does not use a respective container; and
generating a cost of the application based on the total container cost associated with the first tier and the cost of the second tier of the application.

9. The system of claim 8, wherein calculating the direct container cost of the container further comprises:
for the resources of the host used by the container,
retrieving the container resource utilization of the resource of the host used by the container from the monitor container that runs on the host;
retrieving the resource utilization rate of the resource used by the container;
calculating a direct cost of the resource as a product of the container resource utilization and the resource utilization rate; and
calculating the direct container cost of the container as a sum of the direct cost of resources used by the container.

10. The system of claim 8, wherein calculating the indirect container cost further comprises:
for the resources of the host used by the container,
determining a host resource utilization of the resource;
determining a monitor container resource utilization of the resource used by the monitor container;
calculating a host overhead resource cost as a sum of the host resource utilization and the monitor container resource utilization multiplied by the resource utilization rate;
calculating a fraction of the resource used by the container;
calculating an indirect cost of the resource used by the container as a product of the fraction of the resource used by the container and the host overhead resource cost; and
calculating the indirect container cost of the container as the sum of the indirect costs of the resources.

11. The system of claim 8, further comprising:
when the application is run in a single container, assigning the total container cost of the container as the cost of the application; and
when the application is composed of modules run in two or more containers, summing the total container costs of the two or more containers to generate the cost of the application.

12. The system of claim 8, wherein the resource further comprises one or more of CPU, memory, storage, network interface, and input-output of the host.

13. The system of claim 8, further comprising summing the total container costs in a time interval to generate an aggregated container cost of the containers that run in the data center during the time interval.

14. The method system of claim 8, wherein the host further comprises one or more of virtual machines and server computers.

15. A non-transitory computer-readable medium encoded with machine-readable instructions that implement a method carried out by one or more processors of a computer system, the method comprising:
calculating a direct container cost of a container based on a container resource utilization and a resource utilization rate of resources of a host;
calculating an indirect container cost of the container as a sum of an indirect cost of resources of the host used by the container and resources of the host used by a monitor container that monitors the container resource utilization of host resources;
calculating a total container cost of the container as a sum of the direct container cost and the indirect container cost of the container;
identifying an application that is deployed in the container;

determining that the application is a multi-tier application based on the application having a first tier and a second tier, the container being used to execute the first tier of the application;

retrieving from memory a cost of the second tier of the application that does not use a respective container; and generating a cost of the application based on the total container cost associated with the first tier and the cost of the second tier of the application.

16. The non-transitory computer-readable medium of claim 15, wherein calculating the direct container cost of the container further comprises:

for the resources of the host used by the container,
retrieving the container resource utilization of the resource of the host used by the container from the monitor container that runs on the host;
retrieving the resource utilization rate of the resource used by the container; calculating a direct cost of the resource as a product of the container resource utilization and the resource utilization rate; and
calculating the direct container cost of the container as a sum of the direct cost of resources used by the container.

17. The non-transitory computer-readable medium of claim 15, wherein calculating the indirect container cost further comprises:

for resources of the host used by the container,
determining a host resource utilization of the resource;
determining a monitor container resource utilization of the resource used by the monitor container;
calculating a host overhead resource cost as a sum of the host resource utilization and the monitor container resource utilization multiplied by the resource utilization rate;
calculating a fraction of the resource used by the container;
calculating an indirect cost of the resource used by the container as a product of the fraction of the resource used by the container and the host overhead resource cost; and
calculating the indirect container cost of the container as a sum of the indirect costs of the resources.

18. The non-transitory computer-readable medium of claim 15, further comprising:

when the application is run in a single container, assigning the total container cost of the container as the cost of the application; and
when the application is composed of modules run in two or more containers, summing the total container costs of the two or more containers to generate the cost of the application.

19. The non-transitory computer-readable medium of claim 15, wherein the resource further comprises one or more of CPU, memory, storage, network interface, and input-output of the host.

20. The non-transitory computer-readable medium of claim 15, further comprising summing the total container costs in a time interval to generate an aggregated container cost of the containers that run in the data center during the time interval.

21. The non-transitory computer-readable medium of claim 15, wherein the container comprises a first container, and the first container is isolated from a second container on a respective one of the plurality of hosts.

* * * * *